US012658134B2

(12) United States Patent
Kim

(10) Patent No.: US 12,658,134 B2
(45) Date of Patent: Jun. 16, 2026

(54) DISPLAY DEVICE

(71) Applicant: LG Display Co., Ltd., Seoul (KR)

(72) Inventor: Haksu Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/058,253

(22) Filed: Feb. 20, 2025

(65) Prior Publication Data

US 2025/0273151 A1 Aug. 28, 2025

(30) Foreign Application Priority Data

Feb. 26, 2024 (KR) ........................ 10-2024-0027490

(51) Int. Cl.
*G09G 5/00* (2006.01)
*G09G 3/32* (2016.01)
*G09G 3/3233* (2016.01)

(52) U.S. Cl.
CPC ............. *G09G 3/3233* (2013.01); *G09G 3/32* (2013.01); *G09G 2310/08* (2013.01); *G09G 2320/068* (2013.01)

(58) Field of Classification Search
CPC .... G09G 3/3233; G09G 3/32; G09G 2310/08; G09G 2320/068
USPC .......................................................... 345/204
See application file for complete search history.

(56) References Cited

U.S. PATENT DOCUMENTS

2012/0133683 A1* 5/2012 Goden ................. G09G 3/3233 345/77
2022/0399529 A1 12/2022 Shin et al.
2023/0217763 A1* 7/2023 Hong ................... G09G 3/3258
2024/0005873 A1* 1/2024 Kim ..................... G09G 3/3266

FOREIGN PATENT DOCUMENTS

KR 10-2022-0165958 A 12/2022

* cited by examiner

*Primary Examiner* — Jennifer T Nguyen
(74) *Attorney, Agent, or Firm* — Morgan, Lewis & Bockius LLP

(57) ABSTRACT

In one or more examples, a display device is provided, which includes a display panel including a display area provided with a plurality of subpixels and a bezel area. Each of the plurality of subpixels includes a first mode subpixel having a first viewing angle and including a first light emitting element, a second mode subpixel having a second viewing angle and including a second light emitting element, a driving transistor connected to the first light emitting element or the second light emitting element, first and second control transistors controlling the connection between the first light emitting element and the driving transistor, and third and fourth control transistors controlling the connection between the second light emitting element and the driving transistor.

15 Claims, 13 Drawing Sheets

DISPLAY DEVICE

CROSS-REFERENCE TO RELATED APPLICATION

This application claims the benefit of and priority to Korean Patent Application No. 10-2024-0027490 filed on Feb. 26, 2024, the entire contents of which are incorporated herein by reference for all purposes as if fully set forth herein.

BACKGROUND

1. Technical Field

The present disclosure relates to a display device.

2. Description of the Related Art

Recently, a display device has a problem due to leakage of information to a third party through image information displayed thereon. To solve this problem, a security film for providing image information only to a specific person located in front of the display device has been developed.

A user may attach the security film to the display device so that a nearby third party cannot view image information displayed on the display device, and may detach the security film from the display device so that the nearby third party may view the image information displayed on the display device. There is inconvenience in that the user should keep and manage such a security film separately.

The description of the related art should not be assumed to be prior art merely because it is mentioned in or associated with this section. The description of the related art includes information that describes one or more aspects of the subject technology, and the description in this section does not limit the invention.

SUMMARY

The present disclosure has been made in view of the above problems and needs of the related art, and in one or more aspects, the present disclosure is directed to providing a display device that may control a viewing angle without a security film.

An aspect of the present disclosure is directed to providing a display device that may partially control a viewing angle in a display area.

An another aspect of the present disclosure is directed to providing a display device that may implement environment/social/governance (ESG) by attenuating occurrence of greenhouse gases, which may occur due to a manufacturing process.

Other aspects, features and advantages of the present disclosure are set forth in the present disclosure and will also be apparent from the present disclosure or may be learned by practice of the inventive concepts provided herein. Other aspects, features and advantages of the present disclosure may be realized and attained by the descriptions provided in the present disclosure, including the claims and the drawings.

To achieve these and other advantages and in accordance with the purpose of the disclosure, as embodied and broadly described herein, in one or more aspects, there is provided a display device comprising a display panel including a display area provided with a plurality of subpixels. The display panel also includes a bezel area. Each of the plurality of subpixels includes a first mode subpixel having a first viewing angle and including a first light emitting element, a second mode subpixel having a second viewing angle and including a second light emitting element, a driving transistor connected to the first light emitting element or the second light emitting element, first and second control transistors for controlling a connection between the first light emitting element and the driving transistor, and third and fourth control transistors for controlling a connection between the second light emitting element and the driving transistor.

It is to be understood that both the foregoing description and the following description of the present disclosure are examples, and are intended to provide further explanation of the disclosure as claimed.

BRIEF DESCRIPTION OF THE DRAWINGS

The accompanying drawings, which are included to provide a further understanding of the present disclosure, are incorporated in and constitute a part of this present disclosure, illustrate aspects and embodiments of the present disclosure, and together with the description serve to explain principles and examples of the disclosure. In the drawings.

Figure 1:
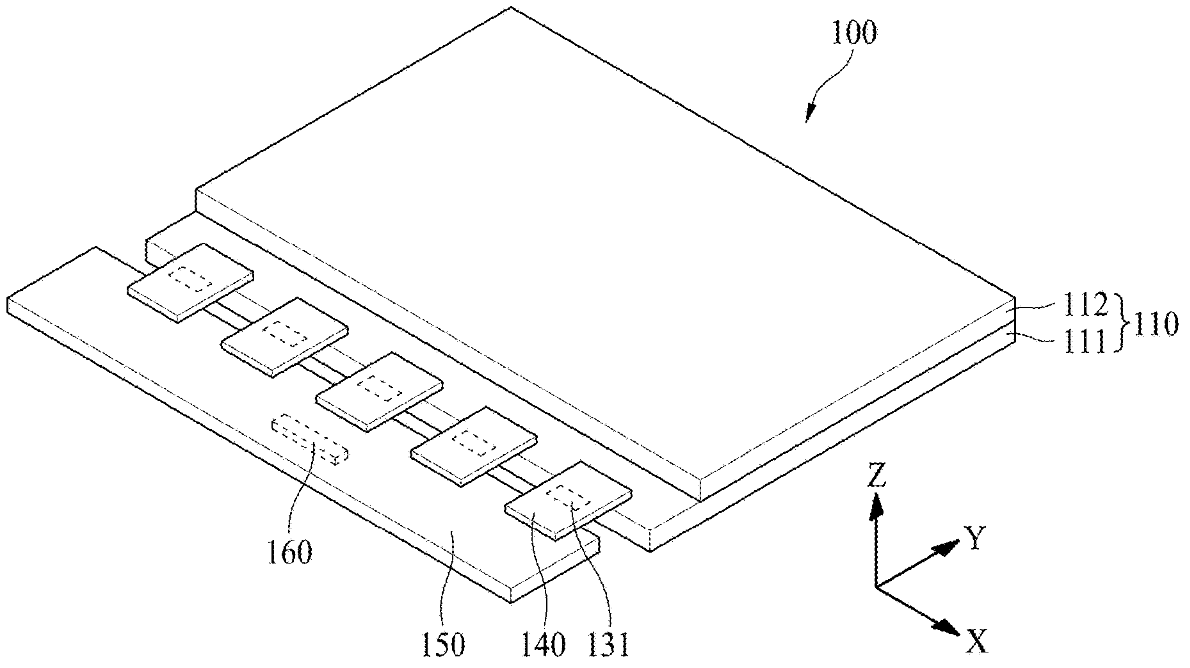
FIG. 1 is a perspective view illustrating a display device according to one embodiment of the present disclosure.

Throughout the drawings and the detailed description, unless otherwise described, the same drawing reference numerals should be understood to refer to the same elements, features, and structures. The sizes, lengths, and thicknesses of layers, regions and elements, and depiction thereof may be exaggerated for clarity, illustration, and/or convenience.

DETAILED DESCRIPTION

Advantages and features of the present disclosure and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete and will fully convey the scope of the present disclosure to those skilled in the art. Further, the present disclosure is only defined by scopes of claims.

A shape, a size, a ratio, an angle and a number disclosed in the drawings for describing embodiments of the present disclosure are merely an example and thus, the present disclosure is not limited to the illustrated details. Like reference numerals refer to like elements throughout the specification. In the following description, when the detailed description of the relevant known function or configuration is determined to unnecessarily obscure the important point of the present disclosure, the detailed description will be omitted. In a case where "comprise", "have" and "include" described in the present disclosure are used, another portion may be added unless "only-" is used. The terms of a singular form may include plural forms unless referred to the contrary. For example, an element may be one or more elements. An element may include a plurality of elements. The word "exemplary" is used to mean serving as an example or illustration. Embodiments are example embodiments. Aspects are example aspects. In one or more implementations, "embodiments," "examples," "aspects," and the like should not be construed to be preferred or advantageous over other implementations. An embodiment, an example, an example embodiment, an aspect, or the like may refer to one or more embodiments, one or more examples, one or more example embodiments, one or more aspects, or the like, unless stated otherwise. Further, the term "may" encompasses all the meanings of the term "can."

In construing an element, the element is construed as including an error band although there is no explicit description.

In describing a position relationship, for example, when the position relationship is described as "upon~", "above~", "below~" and "next to~", one or more portions may be disposed between two other portions unless "just" or "direct" is used.

In describing a temporal relationship, for example, when the temporal order is described as "after," "subsequent," "next," and "before," a case which is not continuous may be included, unless "just" or "direct" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

It should be understood that the term "at least one" includes all combinations related with any one item. For example, "at least one among a first element, a second element and a third element" may include all combinations of two or more elements selected from the first, second and third elements as well as each element of the first, second and third elements.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in a co-dependent relationship.

Hereinafter, one or more example embodiments of a display device according to aspects of the present disclosure will be described in detail with reference to the accompanying drawings. Wherever possible, the same reference numbers will be used throughout the drawings to refer to the same or like parts. Also, in the following description, when the detailed description of the relevant known art is determined to unnecessarily obscure the subject matter of the present disclosure, the detailed description will be omitted.

Hereinafter, one or more example embodiment of the present disclosure will be described in detail with reference to the accompanying drawings.

Figure 2:
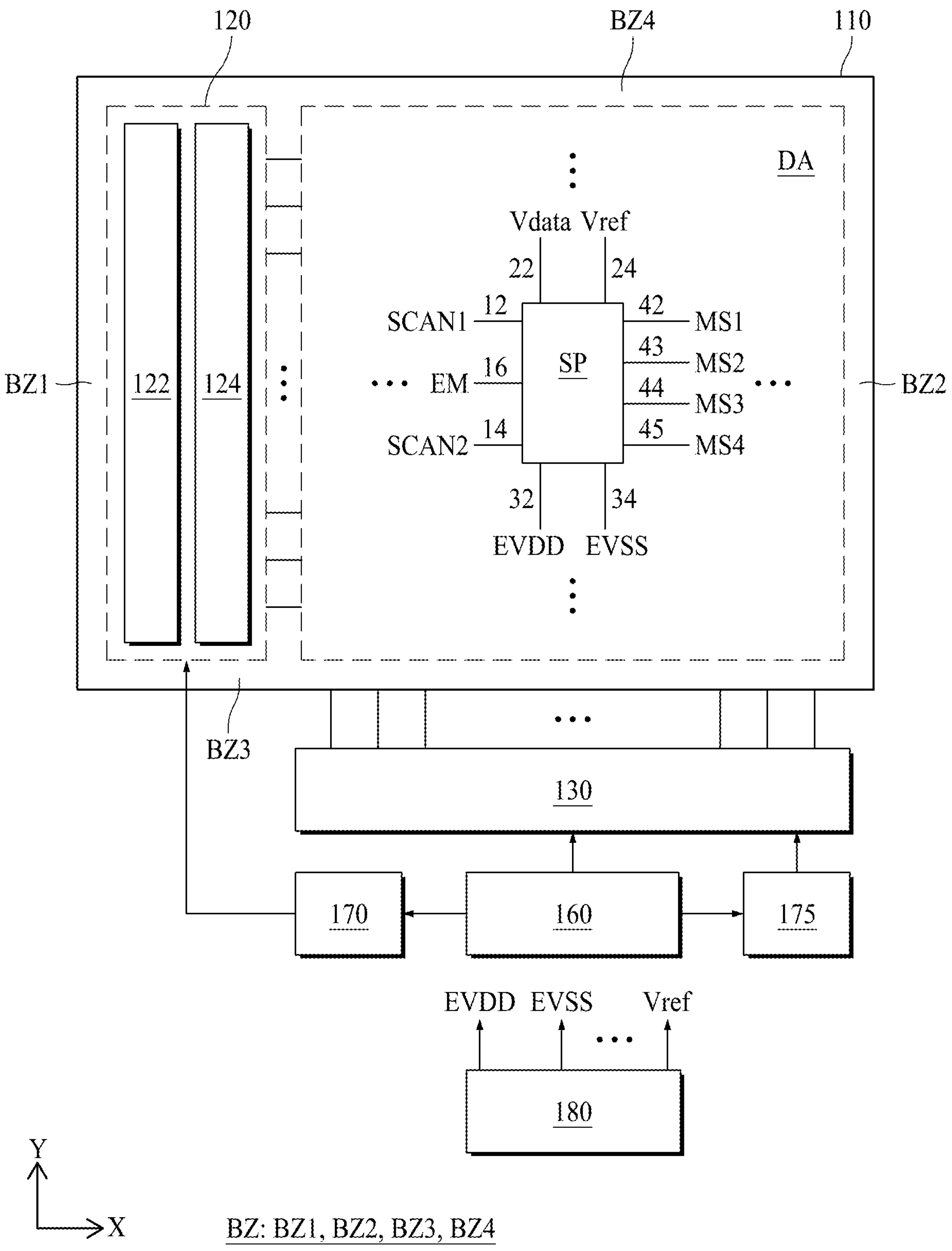
FIG. 2 is a schematic block diagram illustrating a display device according to one embodiment of the present disclosure.
Figure 3:
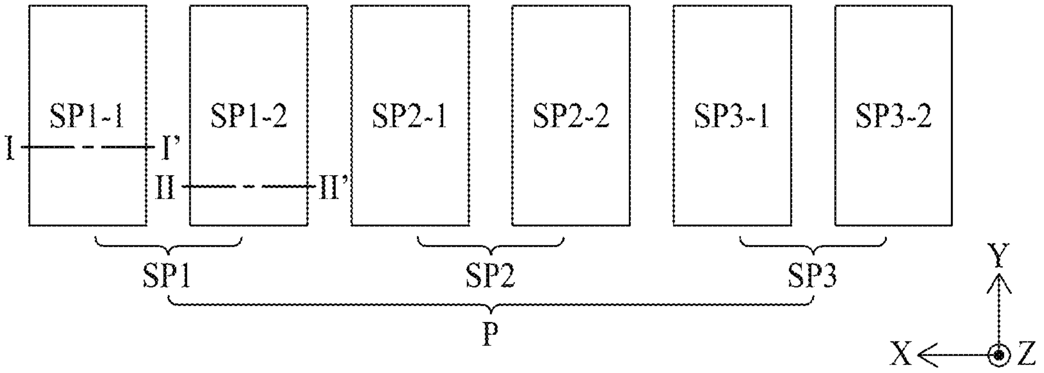
FIG. 3 is a plan view illustrating one example of a pixel provided in a display device according to one embodiment of the present disclosure.

FIG. 1 is a perspective view illustrating a display device according to one embodiment of the present disclosure. FIG. 2 is a schematic block diagram illustrating a display device according to one embodiment of the present disclosure. FIG. 3 is a plan view illustrating one example of a pixel provided in a display device according to one embodiment of the present disclosure.

Although the display device 100 according to the embodiment of the present disclosure will be described to be implemented as an organic light emitting display (OLED), it may be also implemented as a liquid crystal display (LCD), a plasma display panel (PDP), a quantum dot light emitting display (QLED), or an electrophoresis display.

Referring to FIGS. 1 and 2, the display device 100 according to one embodiment of the present disclosure includes a display panel 110, a gate driver 200 embedded in the display panel 110, a data driver 300 connected to the display panel 110, a timing controller 160 controlling the gate driver 120 and the data driver 130, a gamma voltage generator 175, and a power circuit 180. In one embodiment, the display device 100 may further include a level shifter 170 connected between the timing controller 160 and the gate driver 120. In one embodiment, the data driver 130, the timing controller 160, the gamma voltage generator 175 and the level shifter 170 may be integrated into a display driver.

The display panel 110 includes a first substrate 111 and a second substrate 112. The second substrate 112 may be an encapsulation substrate. The first substrate 111 may be made of a plastic film or a glass substrate, but is not limited thereto. The first substrate 111 may be made of a semiconductor material such as a silicon wafer. The second substrate 112 may be a plastic film, a glass substrate or an encapsulation film (protective film).

The display device 100 according to one embodiment of the present disclosure may be configured in a top emission mode in which emitted light is emitted toward an upper portion, but is not limited thereto. When the display device 100 is configured in a top emission mode, the first substrate 111 may be made of an opaque material as well as a transparent material. When the display device 100 is configured in a bottom emission mode in which emitted light is emitted toward a lower portion, the first substrate 111 may be made of a transparent material. Hereinafter, for convenience of description, it is assumed that the display device 100 is configured in a top emission mode, but is not limited thereto.

The display panel 110 includes a display area DA and a bezel area BZ positioned at an outer portion while surrounding the display area DA. The display panel 110 is provided with a plurality of subpixels SP in the form of a matrix in the display area DA to display an image. The plurality of subpixels SP may include a plurality of column lines including subpixels SP arranged in a first direction (e.g., Y-axis direction) and a plurality of row lines including subpixels SP arranged in a second direction (e.g., X-axis direction).

Each of the subpixels SP may be any one of a first subpixel SP1 for emitting red light, a second subpixel SP2 for emitting green light and a third subpixel SP3 for emitting blue light as shown in FIG. 3, but is not limited thereto. The unit pixel P may include at least two subpixels SP. For example, the unit pixel P may include a first subpixel SP1, a second subpixel SP2 and a third subpixel SP3 as shown in FIG. 3. The unit pixel P may further include a fourth subpixel for emitting white light. Also, various modifications may be made in the arrangement order of the subpixels SP1, SP2 and SP3.

Meanwhile, each of the subpixels SP1, SP2 and SP3 may include two or more mode subpixels having different viewing angles. For example, each of the subpixels SP1, SP2 and SP3 shown in FIG. 3 may include first mode subpixels SP1-1, SP2-1 and SP3-1 and second mode subpixels SP1-2, SP2-2 and SP3-2. The first mode subpixels SP1-1, SP2-1 and SP3-1 have a first viewing angle and include a first light emitting element, and the second mode subpixels SP1-2, SP2-2 and SP3-2 may have a second viewing angle and include a second light emitting element. The first viewing angle and the second viewing angle are different from each other in at least one of a direction or an angle range. For example, the second viewing angle may have an angle range smaller than that of the first viewing angle. For another example, the first viewing angle may be 300 in a left direction from a front side of 0°, and the second viewing angle may be 30° in a right direction from the front side of 0°. In an aspect, a subpixel having a viewing angle can be understood as the subpixel configured to emit light with or at the viewing angle. For example, a light emitting element of the subpixel may be configured to emit light with or at the viewing angle.

Each of the subpixels SP1, SP2 and SP3 may selectively drive one of the first light emitting elements and the second light emitting elements to control a viewing angle. For example, each of the subpixels SP1, SP2 and SP3 may implement a first viewing angle mode by driving the first light emitting element of the first mode subpixels SP1-1, SP2-1 and SP3-1. In one embodiment, the first viewing angle mode may be a wide viewing angle mode or a share mode. As another example, each of the subpixels SP1, SP2 and SP3 may implement a second viewing angle mode by driving the second light emitting element of the second mode subpixels SP1-2, SP2-2 and SP3-2. In one embodiment, the second viewing angle mode may be a privacy mode or a narrow viewing angle mode in which an angle range of a viewing angle is limited to be smaller than that of the first viewing angle mode.

A plurality of signal lines including data lines 22, gate lines 12, 14, 16, 42, 43, 44 and 45 and power lines 24, 32 and 34, which are connected to each of the subpixels SP, may be formed in the display panel 110.

The data lines 22 may be formed to be extended in the first direction (e.g., Y-axis direction) to supply a data voltage Vdata supplied from the data driver 130 to each subpixel SP.

The gate lines 12, 14, 16, 42, 43, 44 and 45 may be formed to cross the data lines 22 to supply signals supplied from the gate driver 120 to each subpixel SP. In detail, some 12 and 14 (hereinafter, referred to as "scan lines") of the gate lines 12, 14, 16, 42, 43, 44 and 45 may supply scan signals SCAN1 and SCAN2 supplied from a scan driver 122 to each subpixel SP. Another portion 16 (hereinafter, referred to as an "emission control line") of the gate lines 12, 14, 16, 42, 43, 44 and 45 may supply an emission control signal EM supplied from an emission control driver 124 to each subpixel SP.

Another portions 42, 43, 44 and 45 (hereinafter, referred to as "mode selection lines") of the gate lines 12, 14, 16, 42, 43, 44, 44 and 45 may supply mode selection signals MS1, MS2, MS3 and MS4 supplied from the outside to each subpixel SP.

Among the mode selection lines 42, 43, 44 and 45, the first mode selection line 42 and the second mode selection line 43 may supply first and second mode selection signals MS1 and MS2 for driving the first light emitting element of the first mode subpixels SP1-1, SP2-1 and SP3-1 to each subpixel SP. Among the mode selection lines 42, 43, 44 and 45, the third mode selection line 44 and the fourth mode selection line 45 may supply third and fourth mode selection signals MS3 and MS4 for driving the second light emitting element of the second mode subpixels SP1-2, SP2-2 and SP3-2 to each subpixel SP.

In this case, the display device 100 may selectively drive the first and second light emitting elements of each subpixel SP by using the first to fourth mode selection signals MS1, MS2, MS3 and MS4, thereby controlling the viewing angle of each subpixel SP. A detailed description thereof will be given later.

Among the power lines 24, 32 and 34, the initialization voltage line 24 may supply an initialization voltage Vref supplied from the power circuit 180 to each subpixel SP, the first power line 32 may supply a first power voltage (high potential power voltage) EVDD to each subpixel SP, and the second power line 34 may supply a second power voltage (low potential power voltage) EVSS to each subpixel SP through a common electrode (cathode electrode).

The gate driver 120 may be disposed in at least one of a plurality of bezel areas BZ1 and BZ2 positioned in the outer portion of the display area DA. For example, the gate driver 120 may be disposed in any one of the first and second bezel areas BZ1 and BZ2 facing each other with the display area DA interposed therebetween, or may be disposed at both sides of the first and second bezel areas BZ1 and BZ2. The gate driver 120 may be disposed in a gate in panel (GIP) type including transistors formed in the same process as transistors disposed in the display area DA.

The gate driver 120 may include a scan driver 122 for driving the plurality of scan lines 12 and 14 connected to the subpixels SP of each row line, and an emission control driver 124 for driving the emission control line 16 connected to the subpixels SP of each row line.

Each of the scan driver 122 and the emission control driver 124 may operate by receiving a plurality of gate control signals supplied from the timing controller 160 through the level shifter 170. In one embodiment, each of the scan driver 122 and the emission control driver 124 may receive the plurality of gate control signals from the timing controller 160.

The level shifter 170 may level shift or logic process control signals by receiving the control signals from the timing controller 160 to generate a plurality of gate control signals and supply them to the scan driver 122 and the emission control driver 124.

The scan driver 122 may supply at least one scan signal SCAN1 or SCAN2 to each of the plurality of row lines by using the gate control signal supplied from the level shifter 170 or the timing controller 160. The scan driver 122 may supply the scan signals SCAN1 and SCAN2 to the plurality of scan lines 12 and 14 connected to the subpixels SP of each row line.

The emission control driver 124 may supply the emission control signal EM to each of the row lines by using the gate control signal supplied from the level shifter 170 or the timing controller 160. The emission control driver 124 may supply the emission control signal EM to the emission control line 16 connected to the subpixels SP of each row line.

The gamma voltage generator 175 may generate a plurality of reference gamma voltages having different voltage levels and supply the generated reference gamma voltages to the data driver 130. The gamma voltage generator 175 may generate a plurality of reference gamma voltages corresponding to gamma characteristics of the display device under control of the timing controller 160 and supply the generated reference gamma voltages to the data driver 130. In one embodiment, the gamma voltage generator 175 may adjust reference gamma voltage levels in accordance with gamma data supplied from the timing controller 160 and output the gamma voltage levels to the data driver 130.

The data driver 130 receives digital video data and a data control signal from the timing controller 160. The data driver 130 converts the digital video data into an analog data voltage Vdata by using the data control signal, and supplies the data voltage Vdata to the data lines 22.

The data driver 130 may include a plurality of data drive ICs 131 as shown in FIG. 1. Each of the plurality of data drive ICs 131 may be packaged on a circuit film 140 by a chip on film (COF) mode, a chip on plastic (COP) mode, a flexible printed circuit (FPC) mode, or a flexible flat cable (FFC) mode. The circuit film 140 may be attached onto pads provided in the bezel area BZ of the display panel 110 by using an anisotropic conducting film, whereby the plurality of data drive ICs 131 may be connected to the pads.

The circuit films 140 may be attached to a circuit board 150. A plurality of circuits implemented as driving chips may be packaged on the circuit board 150. For example, the timing controller 160 may be packaged on the circuit board 150. The circuit board 150 may be a printed circuit board or a flexible printed circuit board.

The timing controller 160 receives digital video data DATA and timing signals from a host system. The timing signals may include a vertical synchronization signal, a horizontal synchronization signal, a data enable signal, a dot clock, and the like. The vertical synchronization signal is a signal for defining one frame period. The horizontal synchronization signal is a signal for defining one horizontal period required to supply data voltages to pixels of one horizontal line of the display panel 110. The data enable signal is a signal for defining a period at which valid data is input. The dot clock is a signal repeated at a predetermined short period.

The timing controller 160 generates a data control signal for controlling an operation timing of the data driver 130 and a gate control signal for controlling an operation timing of the gate driver 120 based on timing signals. The timing controller 160 supplies the gate control signal to the gate driver 120, and supplies the digital video data and the data control signal to the data driver 130. The timing controller 160 according to one embodiment may generate control signals for timing control to supply the generated control signals to the level shifter 170 so that the level shifter 170 may generate a plurality of gate control signals and supply the gate control signals to the gate driver 120.

The power circuit 180 may generate and supply a plurality of driving voltages required for operations of all circuit elements of the display device 100 by using an input voltage. The power circuit 180 may generate a first power voltage EVDD, a second power voltage EVSS, and an initialization voltage Vref (reference voltage) and supply the generated voltages to the display panel 110. The power circuit 180 may generate and supply various driving voltages required for the operations of the gate driver 200, the data driver 300, the timing controller 400 and the level shifter 170.

Figure 4:
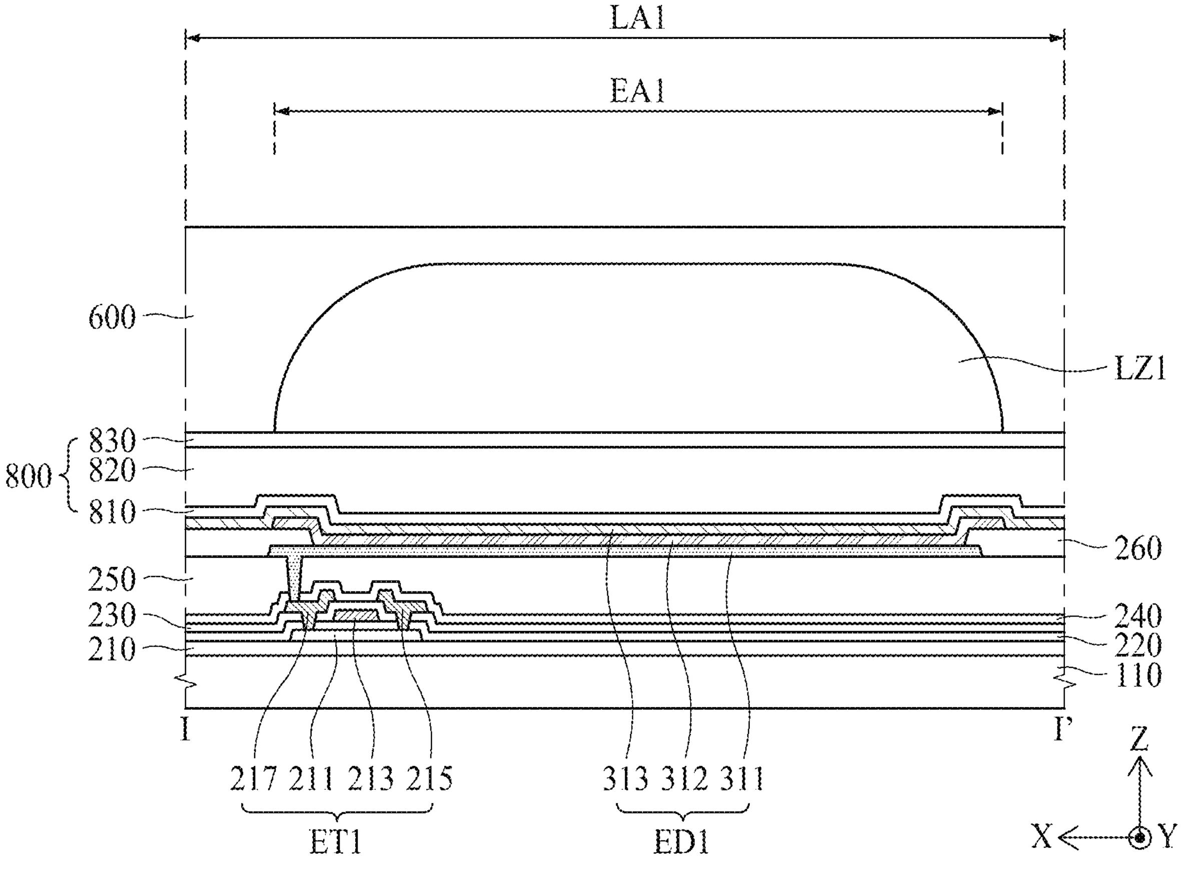
FIG. 4 is a cross-sectional view illustrating a first mode subpixel along the line I-I' shown in FIG. 3.
Figure 5:
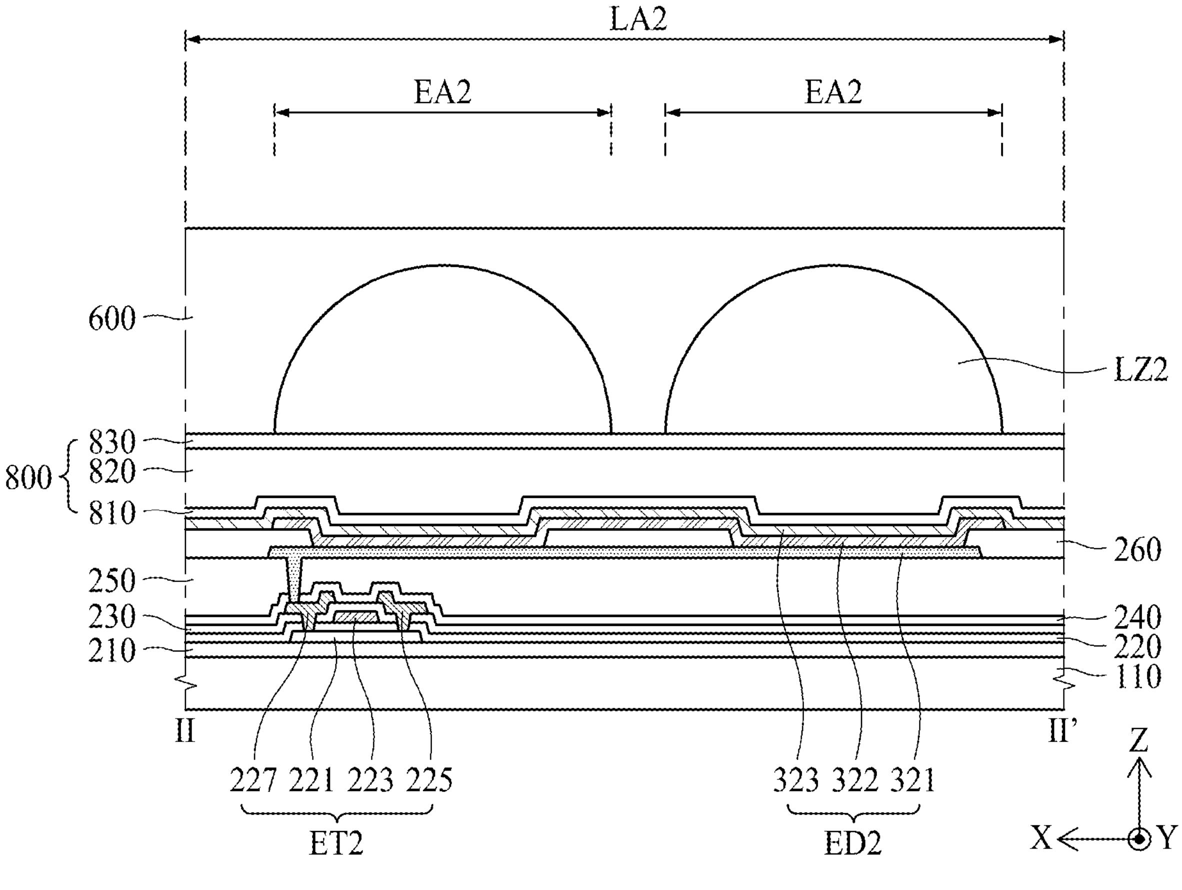
FIG. 5 is a cross-sectional view illustrating a second mode subpixel along the line II-II' shown in FIG. 3.

FIG. 4 is a cross-sectional view illustrating a first mode subpixel along the line I-I' shown in FIG. 3, and FIG. 5 is a cross-sectional view illustrating a second mode subpixel along the line II-II' shown in FIG. 3.

Each of the subpixels SP1, SP2 and SP3 provided in the display panel 110 according to one embodiment of the present disclosure includes first mode subpixels SP1-1, SP2-1 and SP3-1 and second mode subpixels SP1-2, SP2-2 and SP3-2, which have different viewing angles. There are various methods of implementing different viewing angles of the first mode subpixels SP1-1, SP2-1 and SP3-1 and the second mode subpixels SP1-2, SP2-2 and SP3-2, and for example, as shown in FIGS. 4 and 5, the first mode subpixels SP1-1, SP2-1 and SP3-1 and the second mode subpixels SP2-1, SP2-2 and SP2-3, which have different viewing angles, may be implemented using lenses LZ1 and LZ2.

As shown in FIGS. 4 and 5, the display panel 110 according to one embodiment may include a first substrate 111, a circuit element layer including transistors ET1 and ET2 disposed on the first substrate 111, a light emitting element layer including light emitting elements ED1 and ED2 disposed on the circuit element layer, an encapsulation layer 800 disposed on the light emitting element layer, and a lens layer including lenses LZ1 and LZ2 disposed on the encapsulation layer 800. The display panel 110 according to one embodiment may further include a touch sensor layer (not shown) disposed between the encapsulation layer 800 and the lens layer. The display panel 110 according to one embodiment may further include a color filter layer (not shown) that includes a color filter and a black matrix, which are disposed between the touch sensor layer and the lens layer.

Each of the subpixels SP1, SP2 and SP3 may include a first lens area LA1 shown in FIG. 4 and a second lens area LA2 shown in FIG. 5.

Referring to FIG. 4, the first lens area LA1 may include a first mode control transistor ET1 of a pixel circuit, a first light emitting element ED1 connected to the first mode control transistor ET1, and a first lens LZ1 disposed to overlap a first light emission area EA1 on the first light emitting element ED1.

Referring to FIG. 5, the second lens area LA2 may include a second mode control transistor ET2 of the pixel circuit, a second light emitting element ED2 connected to the second mode control transistor ET2, and a plurality of second lenses LZ2 disposed to respectively overlap a plurality of second light emission areas EA2 on the second light emitting element ED2.

In the display panel 110 according to one embodiment, the circuit element layer disposed on the first substrate 111 may include a plurality of insulating layers stacked on the first substrate 111. For example, the plurality of insulating layers may include a buffer layer 210, a gate insulating layer 220, an interlayer insulating layer 230, a passivation layer 240, and a planarization layer 250.

The first substrate 111 may include an insulating material such as glass or plastic. The plastic substrate may be formed of a flexible material. For example, the substrate 110 may include at least one organic insulating material of an acrylic resin, an epoxy-based resin, a siloxane-based resin, a polyimide-based resin or a polyamide-based resin.

The buffer layer 210 may have a single-layered structure or a multi-layered structure, which includes an inorganic insulating material such as silicon oxide (SiOx), silicon nitride (SiNx) and aluminum oxide ($Al_2O_3$). The buffer layer 210 may prevent or reduce impurities such as hydrogen from flowing into semiconductor layers 211 and 221 through the substrate 110.

The transistors ET1 and ET2 may be disposed on the buffer layer 210.

The first mode control transistor ET1 includes a semiconductor layer 211, a gate electrode 213, a source electrode 215 and a drain electrode 217, which are disposed on the buffer layer 110. The second mode control transistor ET2 includes a semiconductor layer 221, a gate electrode 223, a source electrode 225 and a drain electrode 227, which are disposed on the buffer layer 210. The gate insulating layer 220 may be disposed between the semiconductor layers 211 and 221 and the gate electrodes 213 and 223. The interlayer insulating layer 230 may be disposed between the gate electrodes 213 and 223 and the source and drain electrodes 215, 217, 225 and 227. The source electrode 215 and the drain electrode 217 of the first mode control transistor ET1 may be connected to a source area and a drain area of the semiconductor layer 211 through each of contact holes passing through the interlayer insulating layer 230 and the gate insulating layer 220. The source electrode 225 and the drain electrode 227 of the second mode control transistor ET2 may be connected to a source area and a drain area of the semiconductor layer 221 through each of contact holes passing through the interlayer insulating layer 230 and the gate insulating layer 220.

The semiconductor layers 211 and 221 may include polycrystalline silicon, or may include an oxide semiconductor material. The semiconductor layers 211 and 221 may include low temperature polysilicon (LTPS). The semiconductor layers 211 and 221 may include at least one of IZO(InZnO)-based, IGO(InGaO)-based, ITO(InSnO)-based, IGZO(InGaZnO)-based, IGZTO(InGaZnSnO)-based, GZTO(GaZnSnO)-based, GZO(GaZnO)-based or ITZO(InSnZnO)-based oxide semiconductor material. A light shielding layer (not shown) may be further disposed below the semiconductor layers 211 and 221.

The gate insulating layer 220 may include an inorganic insulating material such as silicon oxide (SiOx) and silicon nitride (SiNx). The gate insulating layer 220 may include a material having a high dielectric constant. For example, the gate insulating layer 220 may include a high-k material such as hafnium oxide (HfO). The gate insulating layer 220 may have a multi-layered structure.

Gate lines (not shown) connected to the gate electrodes 213 and 223 may be disposed on the gate insulating layer 220.

The interlayer insulating layer 230 may include an inorganic insulating material such as silicon oxide (SiOx) and silicon nitride (SiNx). The interlayer insulating layer 230 may have a multi-layered structure.

Data lines (not shown) and power lines (not shown), which are connected to the source electrodes 215 and 225 or the drain electrodes 217 and 227, may be disposed on the interlayer insulating layer 230.

The passivation layer 240 and the planarization layer 250 may be stacked on the first and second mode control transistors ET1 and ET2. The passivation layer 240 may include an inorganic insulating material such as silicon oxide (SiOx) and silicon nitride (SiNx). The planarization layer 250 may include an organic insulating material different from the passivation layer 240, and may provide a flat surface.

A light emitting element layer, which includes the first light emitting element ED1 and the second light emitting element ED2, may be disposed on the planarization layer 250.

The first light emitting element ED1 includes a first electrode 311 disposed on the planarization layer 250, a light emitting layer 312 disposed on the first electrode 311, and a second electrode 313 disposed on the light emitting layer 312. The second light emitting element ED2 includes a first electrode 321 disposed on the planarization layer 250, a light emitting layer 322 disposed on the first electrode 321, and a second electrode 323 disposed on the light emitting layer 322. The first light emitting element ED1 and the second light emitting element ED2, which are disposed in the respective subpixels SP1, SP2 and SP3, may emit light of the same color, but are not limited thereto. The first light emitting element ED1 and the second light emitting element ED2, which are disposed in the respective subpixels SP1, SP2 and SP3, may emit light of different colors.

The first electrode 311 of the first light emitting element ED1 may be connected to any one of the source electrode 215 and the drain electrode 217 of the first mode control transistor ET1 through a contact hole passing through the planarization layer 250 and the passivation layer 240. The first electrode 321 of the second light emitting element ED2 may be connected to any one of the source electrode 225 and the drain electrode 227 of the second mode control transistor ET2 through the contact hole passing through the planarization layer 250 and the passivation layer 240.

The first electrodes 311 and 321 may include a conductive material having high reflectivity. The first electrodes 311 and 321 may include a metal such as aluminum (Al), silver (Ag), titanium (Ti) and a silver-palladium-copper (APC) alloy. The first electrodes 311 and 321 may further include a transparent conductive material such as indium tin oxide (ITO) or indium zinc oxide (IZO). For example, the first electrodes 311 and 321 may have a multi-layered structure (Ti/Al/Ti) of titanium (Ti) and aluminum (Al), a multi-layered structure (ITO/Al/ITO) of ITO and aluminum (Al) or a multi-layered structure (ITO/APC/ITO) of ITO and APC.

The light emitting layers 312 and 322 may include an emission material layer (EML) containing a light emitting material. The light emitting material may include an organic material, an inorganic material or a hybrid material. The light emitting layer 312 of the first light emitting element ED1 and the light emitting layer 322 of the second light emitting element ED2 may be spaced apart from each other. Therefore, light emission due to a leakage current may be avoided.

The light emitting layers 312 and 322 may have a multi-layered structure. For example, the light emitting layers 312 and 322 may further include at least one of a hole injection layer (HIL), a hole transport layer (HTL), an electron transport layer (ETL) or an electron injection layer (EIL).

The second electrodes 313 and 323 may include a conductive material for transmitting light. The second electrodes 313 and 323 may include a transparent conductive material such as ITO or IZO. The second electrodes 313 and 323 may include Al, Mg, Ag or their alloy, and may have a thin thickness capable of transmitting light. Therefore, the light generated from each of the light emitting layers 312 and 322 may be emitted through each of the second electrodes 313 and 323.

The first electrode 311 of the first light emitting element ED1 may be spaced apart from the first electrode 321 of the second light emitting element ED2, and a bank 260 may be positioned between the first electrodes 311 and 321. The bank 260 may cover edges of each of the first electrodes 311 and 321. The bank 260 may include an organic insulating material. The bank 260 may include an organic material different from that of the planarization layer 250, and may have a single layered structure or a double layered structure.

The bank 260 may include an opening through which the first electrode 311 is exposed, thereby defining the first light emission area EA1. The light emitting layer 312 and the second electrode 313 of the first light emitting element ED1 may be stacked on the first electrode 311 exposed by the opening of the bank 260.

The bank 260 may include an opening through which the first electrode 321 of the second light emitting element ED2 is exposed, thereby defining the second light emission area ED2. In one embodiment, the bank 260 may include a plurality of openings on the first electrode 321 of the second light emitting element ED2, thereby defining the plurality of second light emission areas EA2. The light emitting layer 322 and the second electrode 323 of the second light emitting element ED2 may be stacked on the first electrode 321 exposed by the opening of the bank 260. The light emitting layer 322 and the second electrode 323 of the second light emitting element ED2 may overlap the first electrode 321 with the bank 260 interposed therebetween. In the second lens area LA2, the plurality of second light emission areas EA2 are independently disposed to be spaced apart from each other by the bank 260, but may share the first electrode 321, the light emitting layer 322 and the second electrode 323 of the second light emitting element ED2. Therefore, light emission efficiency of the second light emission areas EA2 may be improved. A size of the second light emission area EA2 may be smaller than a size of the first light emission area EA1.

The second electrode 313 of the first light emitting element ED1 may be a common electrode electrically connected to the second electrode 323 of the second light emitting element ED2.

The encapsulation layer 800 may be positioned on the light emitting element layer that includes the first light emitting element ED1 and the second light emitting element ED2. The encapsulation layer 800 may prevent the light emitting elements ED1 and ED2 from being damaged due to moisture and impact from the outside. The encapsulation layer 800 may have a multi-layered structure. For example, the encapsulation layer 800 may include a first encapsulation layer 810, a second encapsulation layer 820 and a third encapsulation layer 830, which are sequentially stacked, but is not limited thereto. The first encapsulation layer 810, the second encapsulation layer 820 and the third encapsulation layer 830 may include an insulating material. The second encapsulation layer 820 may include a material different from that of the first encapsulation layer 810 and the third encapsulation layer 830. For example, the first encapsulation layer 810 and the third encapsulation layer 830 may be inorganic encapsulation layers that include an inorganic insulating material, and the second encapsulation layer 820 may include an organic encapsulation layer that includes an organic insulating material. Therefore, the light emitting elements ED1 and ED2 of the display apparatus may be more effectively prevented from being damaged due to moisture and impact from the outside.

The lens layer, which includes a first lens area LZ1 and a second lens area LZ2, may be disposed on the encapsulation layer 800.

The first lens LZ1 may be disposed on the first light emitting element ED1 of the first mode subpixels SP1-1, SP2-1 and SP3-1, and may be disposed on a light moving path of the first light emitting element ED1. The second lens LZ2 may be disposed on the second light emitting element ED2 of the second mode subpixels SP1-2, SP2-2 and SP3-2, and may be disposed on a light moving path of the second light emitting element ED2.

In each of the subpixels SP1, SP2 and SP3, the second light emitting element ED2 may include a plurality of second light emitting elements ED2 or a plurality of second light emission areas EA2, and a plurality of second lenses LZ2 may be individually disposed on the plurality of second light emitting elements ED2 or the plurality of second light emission areas EA2. In each of the subpixels SP1, SP2 and SP3, the plurality of second light emitting elements ED2 or the plurality of second light emission areas EA2 may be connected in parallel.

The first lens LZ1 and the second lens LZ2 may differently control (limit) a viewing angle in at least one direction. For example, the first lens LZ1 and the second lens LZ2 may differently control (limit) a viewing angle in the first direction (e.g., X-axis direction) and equally control (limit) a viewing angle in the second direction (e.g., Y-axis direction).

For example, since the first lens LZ1 does not limit a moving path of light emitted from the first light emitting element ED1 to within a specific angle in the first direction (e.g., X-axis direction), the viewing angle may be controlled to be a wide viewing angle. The second lens LZ2 may limit a moving path of light emitted from the second light emitting element ED2 to within a specific angle in the first direction (e.g., X-axis direction) to control the viewing angle to be a narrow viewing angle.

When the first light emitting element ED1 is driven in each of the subpixels SP1, SP2 and SP3, the corresponding subpixel may operate in a wide viewing angle mode that does not limit the viewing angle in the first direction (e.g., X-axis direction). When the second light emitting element ED2 is driven in each of the subpixels SP1, SP2 and SP3, the corresponding subpixel may operate in a narrow viewing angle mode that limits the viewing angle in the first direction (e.g., X-axis direction).

That is, each of the subpixels SP1, SP2 and SP3 may drive the first light emitting element ED1 to implement a first viewing angle mode, a wide viewing angle mode or a share mode through the first lens area LA1. Each of the subpixels SP1, SP2 and SP3 may drive the second light emitting element ED2 to implement a second viewing angle mode implementing a viewing angle different from the first viewing angle mode, a narrow viewing angle mode, or a privacy mode through the second lens area LA2.

A lens passivation layer 600 may be positioned on the first and second lenses LZ1 and LZ2 of each of the subpixels SP1, SP2 and SP3. The lens passivation layer 600 may include an organic insulating material. A refractive index of the lens passivation layer 600 may be lower than a refractive index of the first lens LZ1 and a refractive index of the second lens LZ2. Therefore, light passing through the first lens LZ1 and the second lens LZ2 may not be reflected in a direction of the first substrate 111 due to a difference in the refractive index from the lens passivation layer 600.

Figure 6:
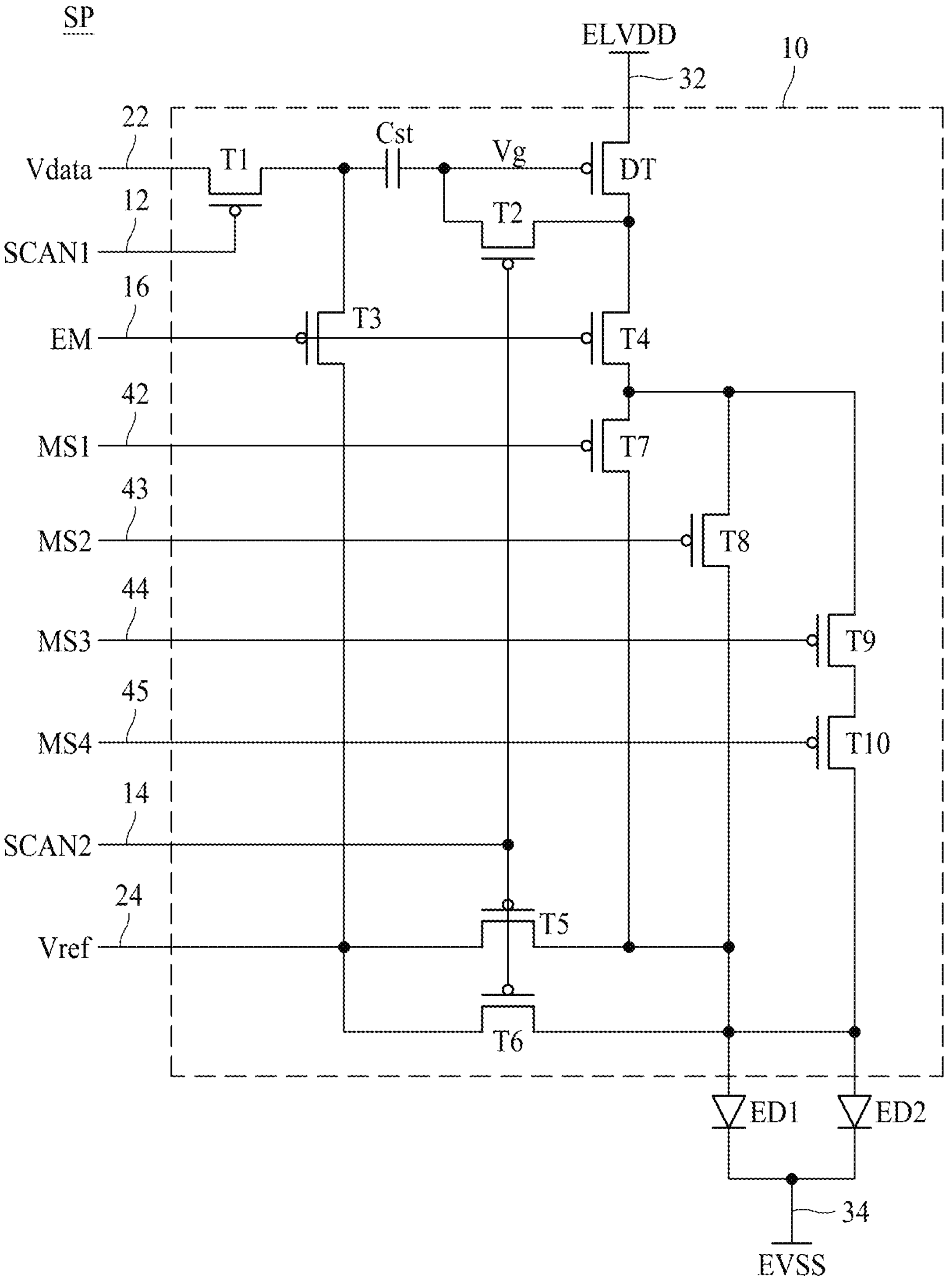
FIG. 6 is an equivalent circuit view illustrating circuit elements of each subpixel in a display panel according to one embodiment of the present disclosure.
Figure 7:
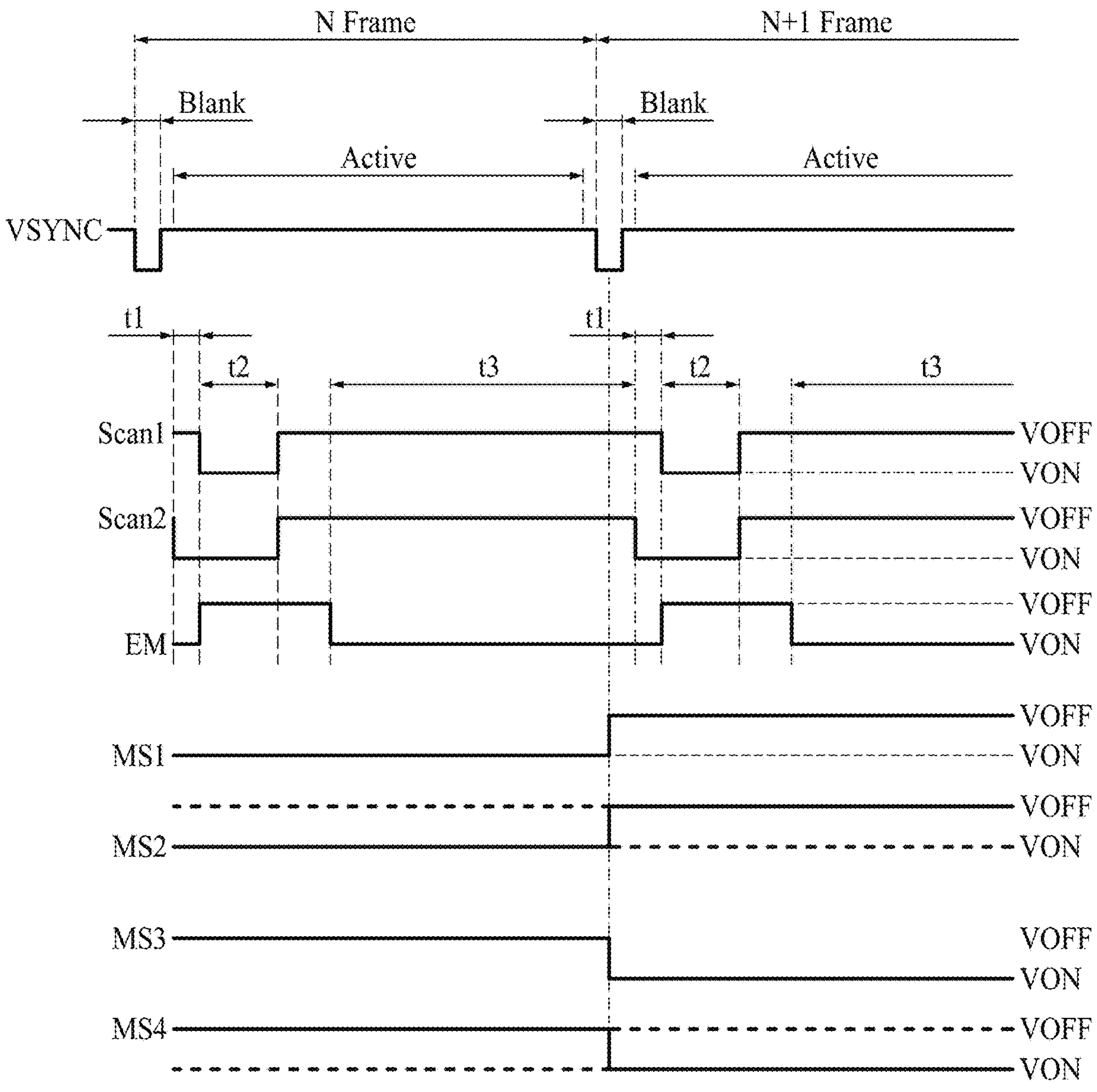
FIG. 7 is a view illustrating driving waveforms for a subpixel of a display panel according to one embodiment of the present disclosure.

FIG. 6 is an equivalent circuit view illustrating circuit elements of each subpixel in a display panel according to one embodiment of the present disclosure, and FIG. 7 is a view illustrating driving waveforms for a subpixel of a display panel according to one embodiment of the present disclosure.

Referring to FIG. 6, each subpixel SP may include a pixel circuit 10 including a plurality of transistors DT and T1 to T10, and first and second light emitting elements ED1 and ED2 connected to the pixel circuit 10.

The pixel circuit 10 shown in FIG. 6 may include ten switching transistors T1 to T10, a driving transistor DT, a storage capacitor Cst. In FIG. 6, the seventh switching transistor T7 may be expressed as a first control transistor, and the eighth switching transistor T8 may be expressed as a second control transistor. At least one of the first control transistor T7 or the second control transistor T8 may correspond to the first mode control transistor ET1 shown in FIG. 4. Also, in FIG. 6, the ninth switching transistor T9 may be expressed as a third control transistor, and the tenth switching transistor T10 may be expressed as a fourth control transistor. At least one of the ninth switching transistor T9 or the tenth switching transistor T10 may correspond to the second mode control transistor ET2 shown in FIG. 5.

Each of the transistors DT and T1 to T10 of each subpixel SP includes a gate electrode, a source electrode, and a drain electrode. Since the source electrode and the drain electrode are not fixed and may be changed in accordance with a voltage and a current direction, which are applied to the gate electrode, one of the source electrode and the drain electrode may be expressed as a first electrode, and the other one may be expressed as a second electrode. The transistors DT and T1 to T10 of each subpixel SP may use at least one of a polysilicon semiconductor, an amorphous silicon semiconductor or an oxide semiconductor. The transistors may be P-type or N-type transistors, or P-type and N-type transistors may be used interchangeably.

Referring to FIGS. 6 and 7, the pixel circuit 10 of each subpixel SP may be driven to include an initialization period t1, a sampling and program period t2, and an emission period t3 for each of frame periods N and N+1. Each of the frame periods N and N+1 may be distinguished by being synchronized with a vertical synchronization signal VSYNC, and may include a blank period and an active period. The active period indicates a time during which image data of one frame is transmitted to the subpixels together with a data enable signal, and the blank period may indicate a period during which image data is not received between active periods of the respective frames. When dummy subpixels are further disposed in the bezel area BZ, a dummy image period during which dummy data is transmitted to the dummy subpixels may be further included before and after the active period.

A first scan signal SCAN1 may be activated by a gate-on voltage VON during the sampling and program period t2, and may be deactivated by a gate-off voltage VOFF during the other periods. A second scan signal SCAN2 may be activated by the gate-on voltage VON during the initialization period t1 and the sampling and program period t2, and may be deactivated by the gate-off voltage VOFF during the other periods.

The emission control signal EM may be activated by the gate-on voltage VON during the initialization period t1 and the emission period t3, and may be deactivated by the gate-off voltage VOFF during the other periods. The first scan signal SCAN1, the second scan signal SCAN2 and the emission control signal EM may be all activated by the gate-off voltage VOFF from the time when the sampling and program period t2 ends to the time when the emission period t3 starts (or holding period), so that a voltage between a gate-source (or drain) of the driving transistor DT may be maintained. Although FIG. 7 shows that the holding period is provided between the sampling and program period t2 and the emission period t3, the present disclosure is not limited thereto. In another embodiment, the holding period may not be provided. In this case, the emission control signal EM may be activated by the gate-on voltage VON at the time when the sampling and program period t2 ends.

The gate-on voltage VON of the first scan signal SCNA1, the second scan signal SCAN2 and the emission control signal EM may be at a low level. The gate-off voltage VOFF of the first scan signal SCNA1, the second scan signal SCAN2 and the emission control signal EM may be at a high level.

The first electrode of the driving transistor DT may be connected to the first power line 32 for supplying a first power voltage EVDD. The first power voltage EVDD may be supplied from the power circuit 180. The second electrode of the driving transistor DT may be commonly connected to the first electrodes of the first to third control transistors T7, T8 and T9. The driving transistor DT may drive the first light emitting element ED1 through the first control transistor T7 or the second control transistor T8, or may drive the second light emitting element ED2 through the third control transistor T9 and the fourth control transistor T10. The driving transistor DT may control a driving current in accordance with a driving voltage Vg of the storage capacitor Cst. As a result, the driving transistor DT may control the light emission intensity of the first light emitting element ED1 through the first control transistor T7 or the second control transistor T8, or may control the light emission intensity of the second light emitting element ED2 through the third control transistor T9 and the fourth control transistor T10.

The storage capacitor Cst may charge the driving voltage Vg corresponding to the data voltage Vdata. The storage capacitor Cst may supply the charged driving voltage Vg to the driving transistor DT.

The first switching transistor T1 may be turned on or off in response to the first scan signal SCAN1 supplied to a first scan line 12. The first switching transistor T1 may supply the data voltage Vdata supplied through the data line 22 to the first electrode of the storage capacitor Cst during the sampling and programming period t2 in response to the gate-on voltage VON of the first scan signal SCAN1. The first scan signal SCAN1 may be supplied from the scan driver 122 (see FIG. 2).

The second, fifth and sixth switching transistors T2, T5 and T6 may be turned on or off in response to the second scan signal SCAN2 supplied to the second scan line 14. The second scan signal SCAN2 may be supplied from the scan driver 122 (see FIG. 2).

The second switching transistor T2 may connect the driving transistor DT in a diode structure by connecting the gate electrode and the second electrode of the driving transistor DT with each other during the initialization period t1 and the sampling and program period t2 in response to the gate-on voltage VON of the second scan signal SCAN2. The second switching transistor T2 may charge a threshold voltage Vth of the driving transistor DT in the storage capacitor Cst to compensate for the storage capacitor Cst. Accordingly, the storage capacitor Cst may charge the data voltage Vdata+Vth compensated for the threshold voltage Vth of the driving transistor DT during the sampling and program period t2.

The fifth switching transistor T5 may supply the initialization voltage Vref (or reference voltage) supplied through the initialization voltage line 24 to an anode electrode of the first light emitting element ED1 during the initialization period t1 and the sampling and program period t2 in response to the gate-on voltage VON of the second scan signal SCAN2.

The sixth switching transistor T6 may supply the initialization voltage Vref (or reference voltage) supplied through the initialization voltage line 24 to an anode electrode of the second light emitting element ED2 during the initialization period t1 and the sampling and program period t2 in response to the gate-on voltage VON of the second scan signal SCAN2.

The third switching transistor T3 may be turned on or off in response to the emission control signal EM supplied to the emission control line 16. The emission control signal EM may be supplied from the emission control driver 124 (see FIG. 2).

The third switching transistor T3 may supply the initialization voltage Vref (or reference voltage) supplied through the initialization voltage line 24 to the first electrode of the storage capacitor Cst during the initialization period t1 and the emission period t3 in response to the gate-on voltage VON of the emission control signal EM.

The fourth switching transistor T4 may connect the driving transistor DT to at least one of the first, second or third control transistor T7, T8 or T9 during the initialization period t1 and the emission period t3 in response to the gate-on voltage of the emission control signal EM.

The first to fourth control transistors T7, T8, T9 and T10 may be turned on or off by being controlled by the mode selection signals MS1, MS2, MS3 and MS4 supplied to the mode selection lines 42, 43, 44 and 45.

When the corresponding subpixel is controlled in the first viewing angle mode or the second viewing angle mode, a portion of the mode selection signals MS1, MS2, MS3 and MS4 may be activated by the gate-on voltage VON, and the other portions thereof may be deactivated by the gate-off voltage VOFF. The gate-on voltage VON of the mode selection signals MS1, MS2, MS3 and MS4 may be at a low level. The gate-off voltage VOFF of the first scan signal SCNA1, the second scan signal SCAN2 and the emission control signal EM may be at a high level.

The mode selection signals MS1, MS2, MS3 and MS4 may be switched from the gate-on voltage VON to the gate-off voltage VOFF or from the gate-off voltage VOFF to the gate-on voltage VON at a blank period between the (N)th (N is a natural number) frame period and the (N+1)th frame period when the mode is switched.

In each of the subpixels SP1, SP2 and SP3, the first light emitting element ED1 may be driven using the first control transistor T7 controlled by the first mode selection signal MS1 and the second control transistor T8 controlled by the second mode selection signal MS2. In detail, the first control transistor T7 may be turned on or off by being controlled by the first mode selection signal MS1 supplied to the first mode selection line 42. The first control transistor T7 may be turned on when the first mode selection signal MS1 is the gate-on voltage VON, thereby connecting the driving transistor DT with the first light emitting element ED1 during the emission period t3. As a result, the first light emitting element ED1 may be driven by the driving current from the driving transistor DT to emit light. The subpixels SP1, SP2 and SP3 may emit light at the first viewing angle through the first lens LZ1, and may operate in the first viewing angle mode, the wide viewing angle mode or the share mode.

The second control transistor T8 may be turned on or off by being controlled by the second mode selection signal MS2 supplied to the second mode selection line 43. The second control transistor T8 may be turned on when the second mode selection signal MS2 is the gate-on voltage VON, thereby connecting the driving transistor DT with the first light emitting element ED1 during the emission period t3. As a result, the first light emitting element ED1 may be driven by the driving current from the driving transistor DT to emit light. The subpixels SP1, SP2 and SP3 may emit light at the first viewing angle through the first lens LZ1, and may operate in the first viewing angle mode, the wide viewing angle mode or the share mode.

The first control transistor T7 and the second control transistor T8 may be connected in parallel. When one of the first control transistor T7 and the second control transistor T8, which are connected in parallel, is turned on, the first light emitting element ED1 may be connected to the driving transistor DT through at least one of the first control transistor T7 or the second control transistor T8. That is, when one of the first control transistor T7 and the second control transistor T8, which are connected in parallel, is turned on, the subpixels SP1, SP2 and SP3 may operate in the first viewing angle mode, the wide viewing angle mode or the share mode, which emits light at the first viewing angle through the first lens LZ1.

In each of the subpixels SP1, SP2 and SP3, the second light emitting element ED2 may be driven using the third control transistor T9 controlled by the third mode selection signal MS3 and the fourth control transistor T10 controlled by the fourth mode selection signal MS4. In detail, the third control transistor T9 may be turned on or off by being controlled by the third mode selection signal MS3 supplied to the third mode selection line 44. The third control transistor T9 may be turned on when the third mode selection signal MS3 is the gate-on voltage VON, thereby connecting the driving transistor DT with the fourth control transistor T10 during the emission period t3.

The fourth control transistor T10 may be turned on or off by being controlled by the fourth mode selection signal MS4 supplied to the fourth mode selection line 45. The fourth control transistor T10 may be turned on when the fourth mode selection signal MS4 is the gate-on voltage VON, thereby connecting the fourth control transistor T10 with the second light emitting element ED2 during the emission period t3.

The third control transistor T9 and the fourth control transistor T10 may be connected in series. When both the third control transistor T9 and the fourth control transistor T10, which are connected in series, are turned on, the second light emitting element ED2 may be connected to the driving transistor DT through the third control transistor T9 and the fourth control transistor T10. That is, when both the third control transistor T9 and the fourth control transistor T10, which are connected in series, are turned on, the subpixels SP1, SP2 and SP3 may operate in the second viewing angle mode, the narrow viewing angle mode or the privacy mode, which emits light at the second viewing angle through the second lens LZ2.

Each of the light emitting elements ED1 and ED2 may include an anode electrode individually connected to each of the control transistors T7 or T8 and T9 or T10, a cathode electrode supplied with the second power voltage EVSS from the second power line 34, and light emitting layer between the anode electrode and the cathode electrode. The anode electrode is an electrode independent for each light emitting element, but the cathode electrode may be a common electrode shared by all the light emitting elements.

When a driving current is supplied from the driving transistor DT through the first control transistor T7 or the second control transistor T8, electrons from the cathode electrode are injected into the light emitting layer, and holes from the anode electrode are injected into an organic light emitting layer to emit fluorescent or phosphorescent materials through recombination of electrons and holes in the light emitting layer. The first light emitting element ED1 may thereby generate light with brightness proportional to a current value of the driving current.

The first light emitting element ED1 may be driven using the first control transistor T7 controlled by the first mode selection signal MS1 and the second control transistor T8 controlled by the second mode selection signal MS2. In detail, when the first control transistor T7 is turned on by the gate-on voltage VON of the first mode selection signal MS1 or when the second control transistor T8 is turned on by the gate-on voltage VON of the second mode selection signal MS2, the first light emitting element ED1 may be driven by being connected to the driving transistor DT. The first lens LZ1 disposed in a light moving direction of the first light emitting element ED1 may control the viewing angle to be the first viewing angle.

When the driving current is supplied from the driving transistor DT through the third control transistor T9 and the fourth control transistor T10, electrons from the cathode electrode may be injected into the light emitting layer and holes from the anode electrode may be injected into the organic light emitting layer so that fluorescent or phosphorescent materials may emit light through recombination of the electrons and the holes in the light emitting layer. The second light emitting element ED2 may thereby generate light of brightness proportional to a current value of the driving current.

The second light emitting element ED2 may be driven using the third control transistor T9 controlled by the third mode selection signal MS3 and the fourth control transistor T10 controlled by the fourth mode selection signal MS4. In detail, when the third control transistor T9 is turned on by the gate-on voltage VON of the third mode selection signal MS3 and the fourth control transistor T10 is turned on by the gate-on voltage VON of the fourth mode selection signal MS4, the second light emitting element ED2 may be driven by being connected to the driving transistor DT. The second lens LZ2 disposed in the light moving direction of the second light emitting element ED2 may control the viewing angle to be the second viewing angle.

The display panel 110 according to one embodiment of the present disclosure may select one of the first viewing angle mode and the second viewing angle mode as a mode of each of the subpixels SP1, SP2 and SP3 by using the first to fourth mode selection signals MS1, MS2, MS3 and MS4. Each of the subpixels SP1, SP2 and SP3 provided in the display panel 110 according to one embodiment of the present disclosure includes first mode subpixels SP1-1, SP2-1 and SP3-1 provided with the first light emitting element ED1 at the first viewing angle, and second mode subpixels SP1-2, SP2-2 and SP3-2 provided with the second light emitting element ED2 at the second viewing angle.

Each of the subpixels SP1, SP2 and SP3 may allow one of the first light emitting element ED1 and the second light emitting element ED2 to emit light by using the mode selection signals MS1, MS2, MS3 and MS4 applied through the mode selection lines 42, 43, 44, and 45. In the display panel 110 according to one embodiment of the present disclosure, as shown in FIG. 7, the first mode selection signal MS1 and the third mode selection signal MS3 may have opposite phases to each other. The display panel 110 according to one embodiment of the present disclosure may supply the gate-on voltage VON of the first mode selection signal MS1, and may supply the gate-off voltage VOFF of the third mode selection signal MS3. Alternatively, the display panel 110 according to one embodiment of the present disclosure may supply the gate-off voltage VOFF of the first mode selection signal MS1, and may supply the gate-on voltage VON of the third mode selection signal MS3.

Also, in the display panel 110 according to one embodiment of the present disclosure, the second mode selection signal MS2 and the fourth mode selection signal MS4 may have opposite phases to each other. The display panel 110 according to one embodiment of the present disclosure may supply the gate-on voltage VON of the second mode selection signal MS2, and may supply the gate-off voltage VOFF of the fourth mode selection signal MS4. Alternatively, the display panel 110 according to one embodiment of the present disclosure may supply the gate-off voltage VOFF of the second mode selection signal MS2, and may supply the gate-on voltage VON of the fourth mode selection signal MS4.

The display panel 110 according to one embodiment of the present disclosure may turn on each of the first control transistor T7 and the second control transistor T8 by supplying the gate-on voltage VON of each of the first mode selection signal MS1 and the second mode selection signal MS2. Accordingly, the first light emitting element ED1 may emit light. On the other hand, since the gate-on voltage VON is supplied as the first mode selection signal MS1, the gate-off voltage VOFF may be supplied as the third mode selection signal MS3, and since the gate-on voltage VON is supplied as the second mode selection signal MS2, the gate-off voltage VOFF may be supplied as the fourth mode selection signal MS4. Each of the third control transistor T9 and the fourth control transistor T10 may be turned off, and the second light emitting element ED2 may not emit light. That is, only the first light emitting element ED1 of the first light emitting element ED1 and the second light emitting element ED2, which are provided in the same subpixel SP, may emit light.

Alternatively, the display panel 110 according to one embodiment of the present disclosure may supply the gate-on voltage VON of the first mode selection signal MS1, and the gate-off voltage VOFF of the second mode selection signal MS2. In this case, the first control transistor T7 may be turned on, and the second control transistor T8 may be turned off. Since the first control transistor T7 and the second control transistor T8 are connected in parallel, the first light emitting element ED1 may be connected to the driving transistor DT through the first control transistor T7. Accordingly, the first light emitting element ED1 may emit light. On the other hand, since the gate-on voltage VON is supplied as the first mode selection signal MS1, the gate-off voltage VOFF may be supplied as the third mode selection signal MS3, and since the gate-off voltage VOFF is supplied as the second mode selection signal MS2, the gate-on voltage VON may be supplied as the fourth mode selection signal MS4. In this case, the third control transistor T9 may be turned off, and the fourth control transistor T10 may be turned on. Since the third control transistor T9 and the fourth control transistor T10 are connected in series and the third control transistor T9 is turned off, the second light emitting element ED2 cannot be connected to the driving transistor DT. Accordingly, the second light emitting element ED2 may not emit light. That is, only the first light emitting element ED1 of the first light emitting element ED1 and the second light emitting element ED2, which are provided in the same subpixel SP, may emit light.

On the contrary, the display panel 110 according to one embodiment of the present disclosure may supply the gate-off voltage VOFF of the first mode selection signal MS1, and the gate-on voltage VON of the second mode selection signal MS2. In this case, the first control transistor T7 may be turned off, and the second control transistor T8 may be turned on. Since the first control transistor T7 and the second control transistor T8 are connected in parallel, the first light emitting element ED1 may be connected to the driving transistor DT through the second control transistor T8. Accordingly, the first light emitting element ED1 may emit light. On the other hand, since the gate-off voltage VOFF is supplied as the first mode selection signal MS1, the gate-on voltage VON may be supplied as the third mode selection signal MS3, and since the gate-on voltage VON is supplied as the second mode selection signal MS2, the gate-off voltage VOFF may be supplied as the fourth mode selection signal MS4. In this case, the third control transistor T9 may be turned on, and the fourth control transistor T10 may be turned off. Since the third control transistor T9 and the fourth control transistor T10 are connected in series and the fourth control transistor T10 is turned off, the second light emitting element ED2 cannot be connected to the driving transistor DT. Accordingly, the second light emitting element ED2 may not emit light. That is, only the first light emitting element ED1 of the first light emitting element ED1 and the second light emitting element ED2, which are provided in the same subpixel SP, may emit light.

Finally, the display panel 110 according to one embodiment of the present disclosure may supply the gate-off voltage VOFF of each of the first mode selection signal MS1 and the second mode selection signal MS2. In this case, each of the first control transistor T7 and the second control transistor T8 is turned off, and thus the first light emitting element ED1 may not emit light. On the other hand, since the gate-off voltage VOFF is supplied as the first mode selection signal MS1, the gate-on voltage VON may be supplied as the third mode selection signal MS3, and since the gate-off voltage VOFF is supplied as the second mode selection signal MS2, the gate-on voltage VON may be supplied as the fourth mode selection signal MS4. Since the third control transistor T9 and the fourth control transistor T10 are turned on, the second light emitting element ED2 may be connected to the driving transistor DT through the third control transistor T9 and the fourth control transistor T10. That is, only the second light emitting element ED2 of the first light emitting element ED1 and the second light emitting element ED2, which are provided in the same subpixel SP, may emit light.

As a result, the first light emitting element ED1 and the second light emitting element ED2, which are provided in the same subpixel SP, may not simultaneously emit light.

When the corresponding subpixel is controlled in the first viewing angle mode, the wide viewing angle mode or the share mode, at least one of the first mode selection signal MS1 and the second mode selection signal MS2 may be activated by the gate-on voltage VON. Meanwhile, when the corresponding subpixel is controlled in the second viewing angle mode, the narrow viewing angle mode or the privacy mode, both of the first mode selection signal MS1 and the second mode selection signal MS2 may be deactivated by the gate-off voltage VOFF.

On the other hand, when the corresponding subpixel is controlled in the second viewing angle mode, the narrow viewing angle mode or the privacy mode, both of the third mode selection signal MS3 and the fourth mode selection signal MS4 may be activated by the gate-on voltage VON. When the corresponding subpixel is controlled in the first viewing angle mode, the wide viewing angle mode or the share mode, at least one of the third mode selection signal MS3 and the fourth mode selection signal MS4 may be deactivated by the gate-off voltage VOFF.

Figure 8:
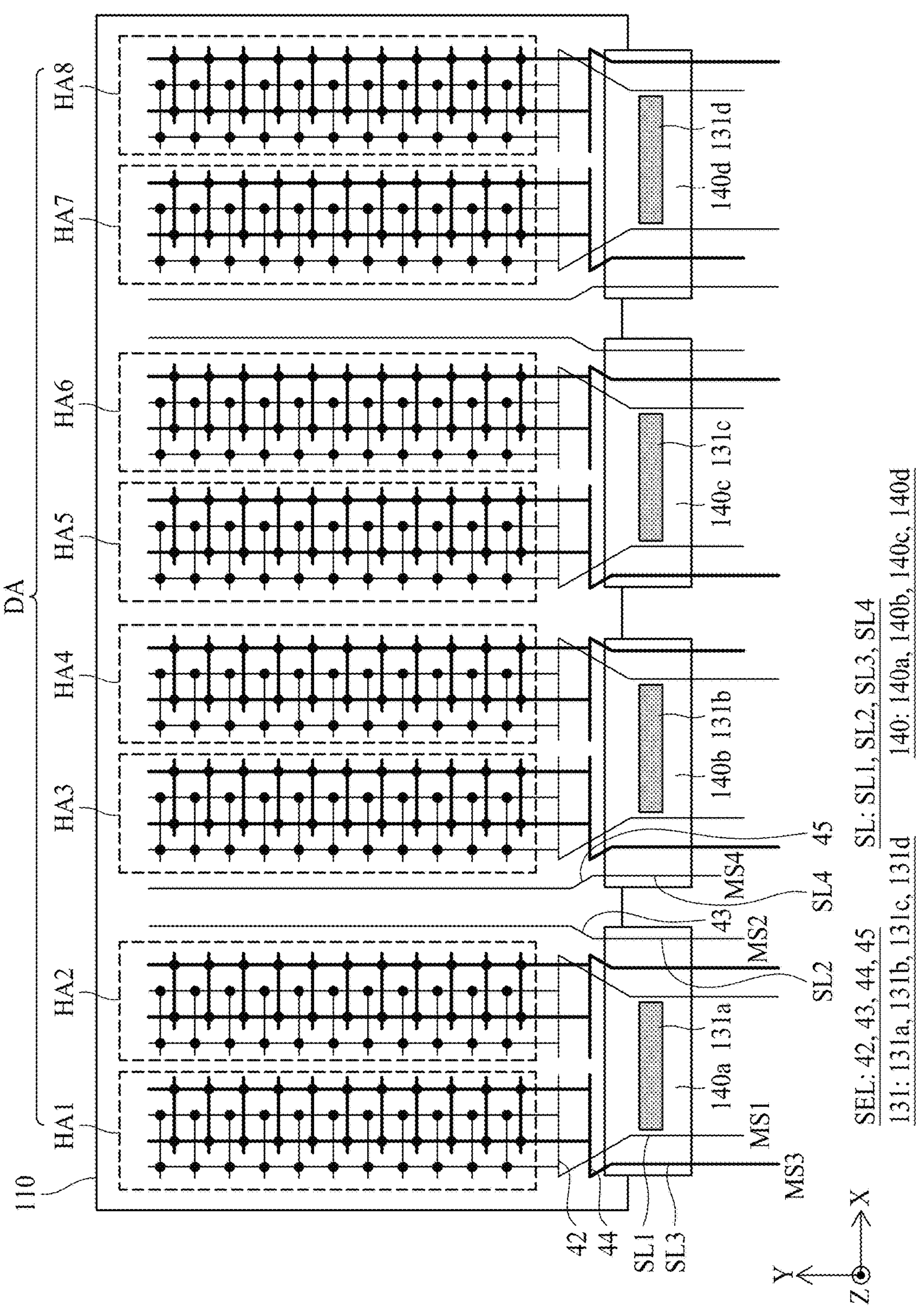
FIG. 8 is a view illustrating an example of a first mode selection line and a third mode selection line in a display device according to one embodiment of the present disclosure.
Figure 9A:
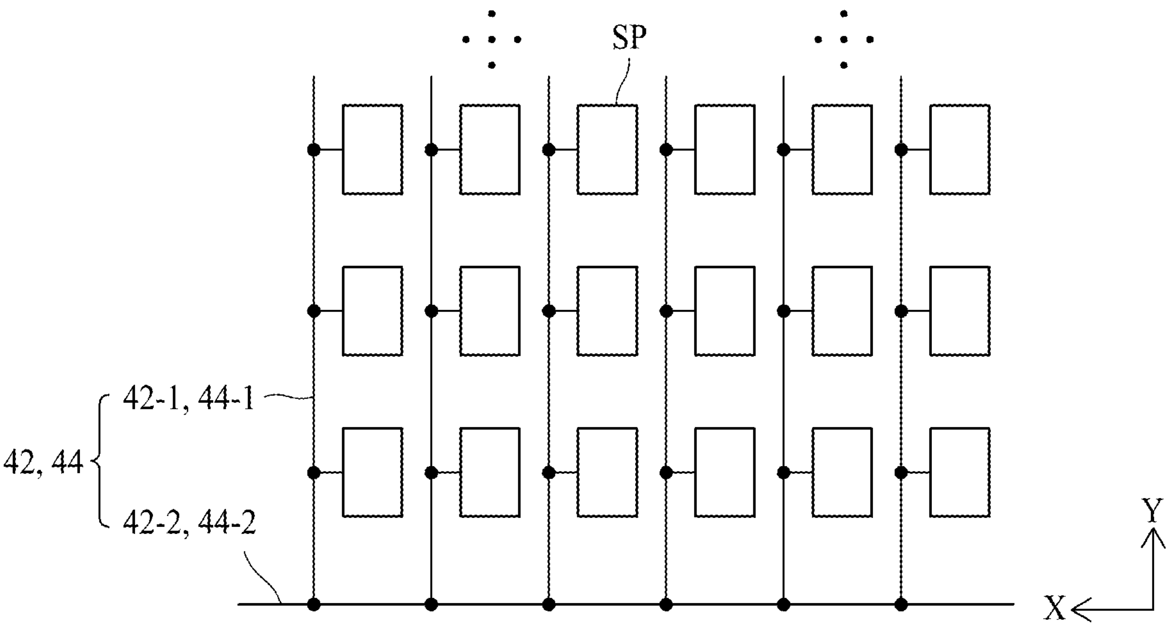
FIG. 9A is a view illustrating an example of a connection structure between first and third mode selection lines and subpixels.
Figure 9B:
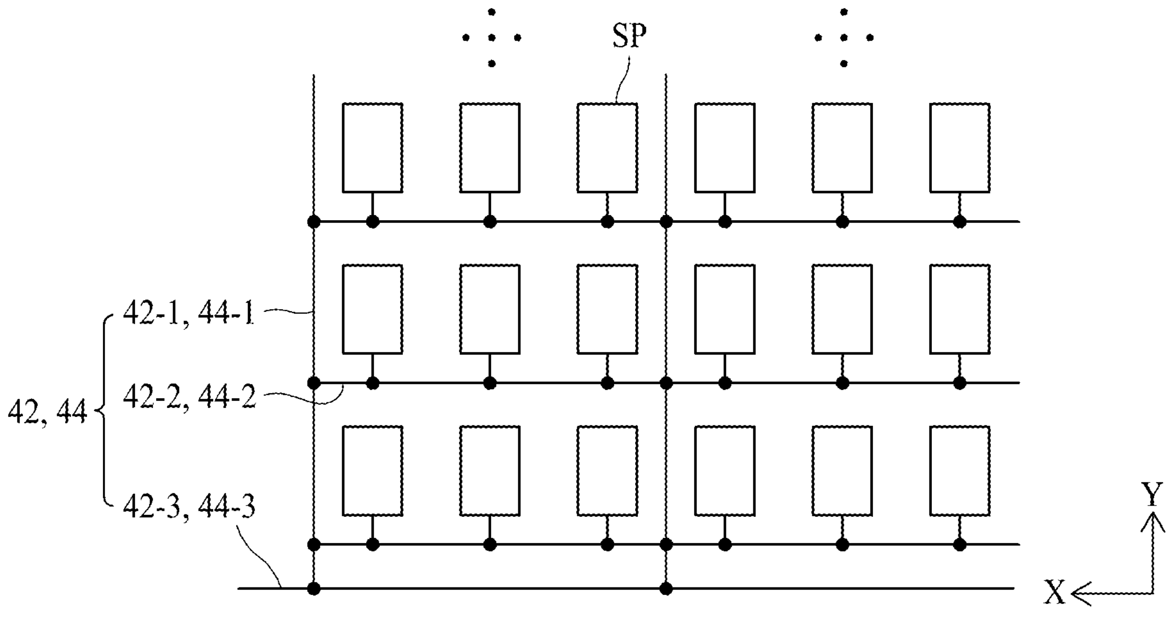
FIG. 9B is a view illustrating another example of a connection structure between first and third mode selection lines and subpixels.
Figure 10:
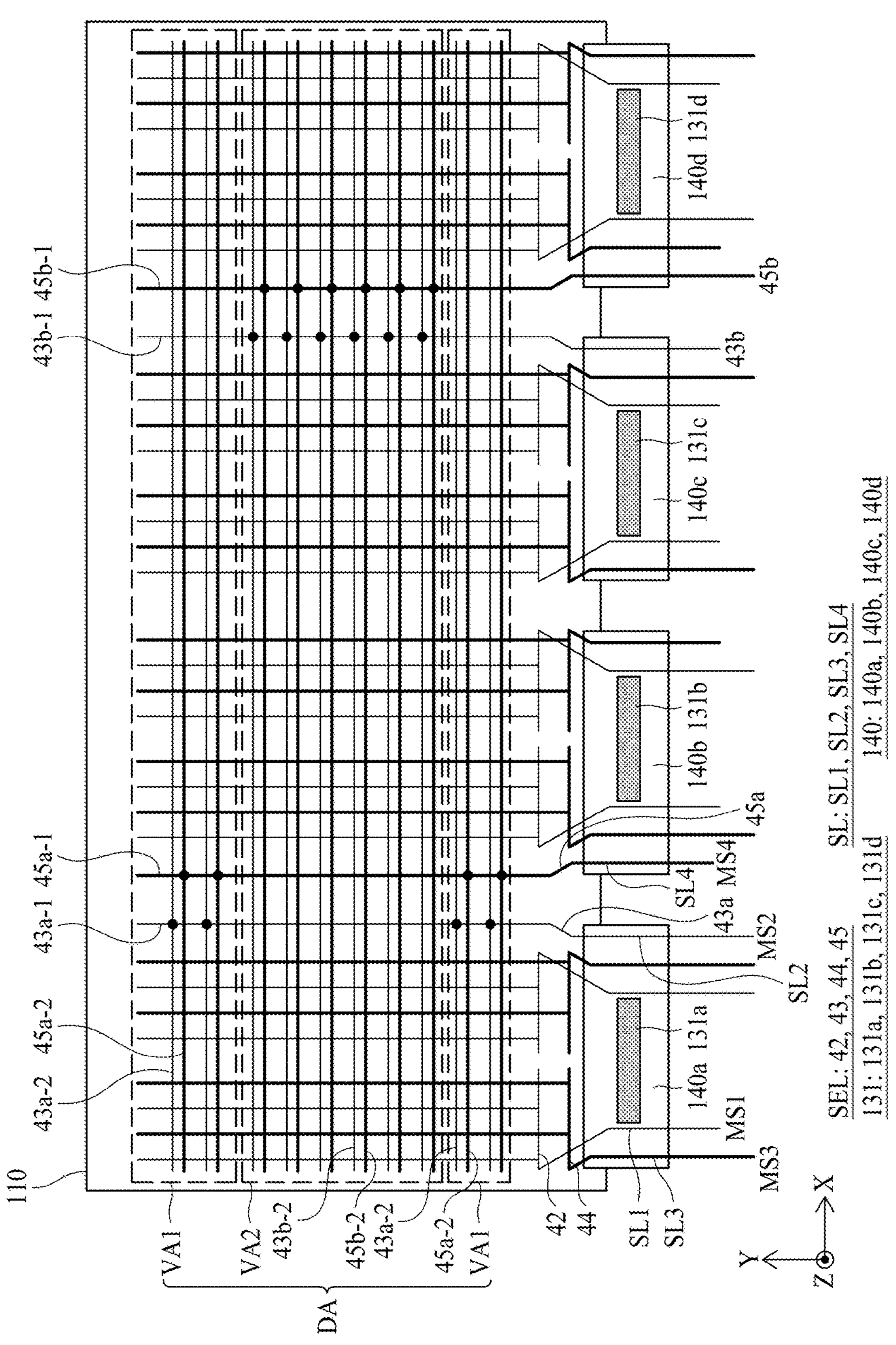
FIG. 10 is a view illustrating an example of a second mode selection line and a fourth mode selection line in a display device according to one embodiment of the present disclosure.
Figure 11:
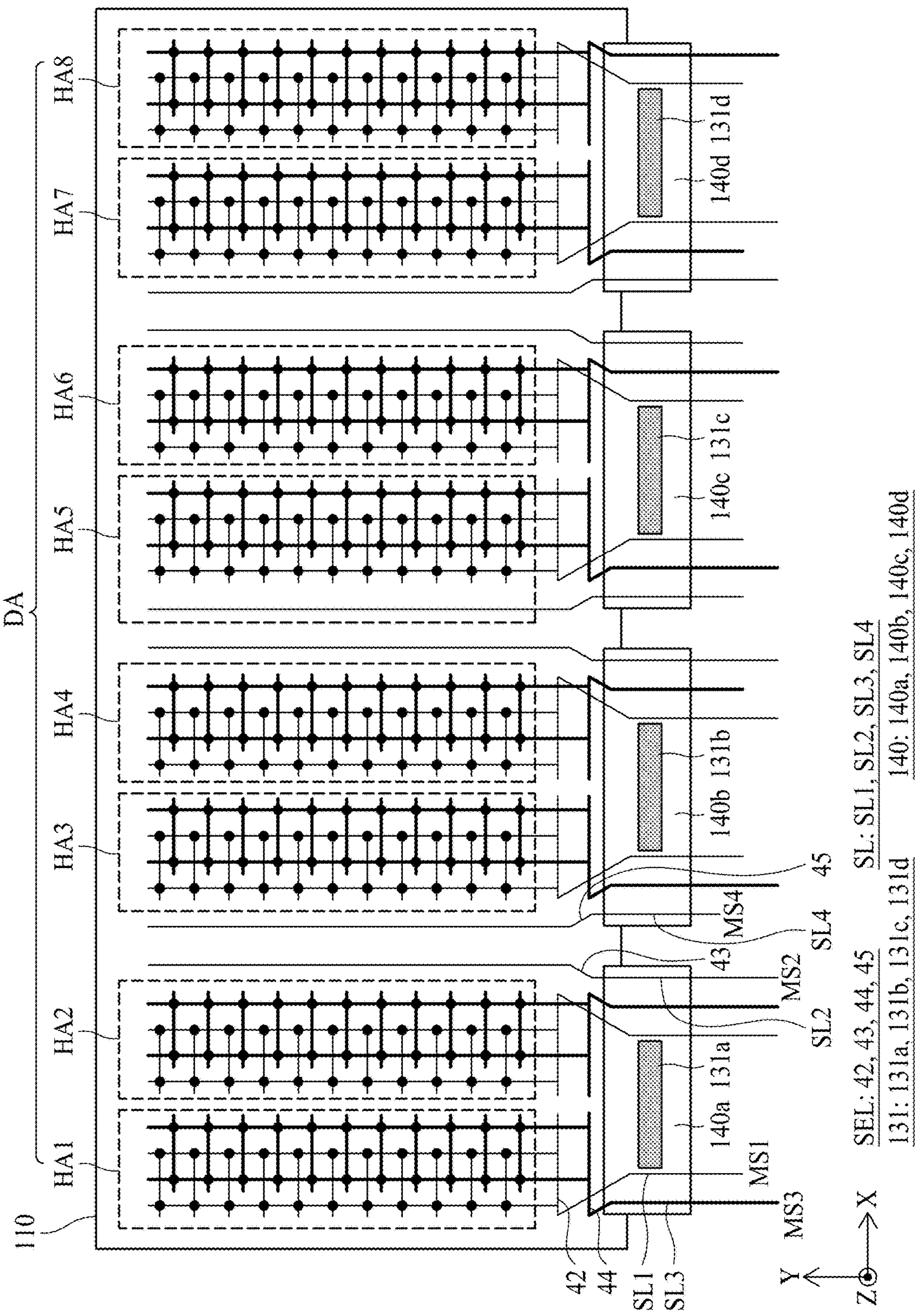
FIG. 11 is a view illustrating an example of a first mode selection line and a third mode selection line in a display device according to another embodiment of the present disclosure.
Figure 12:
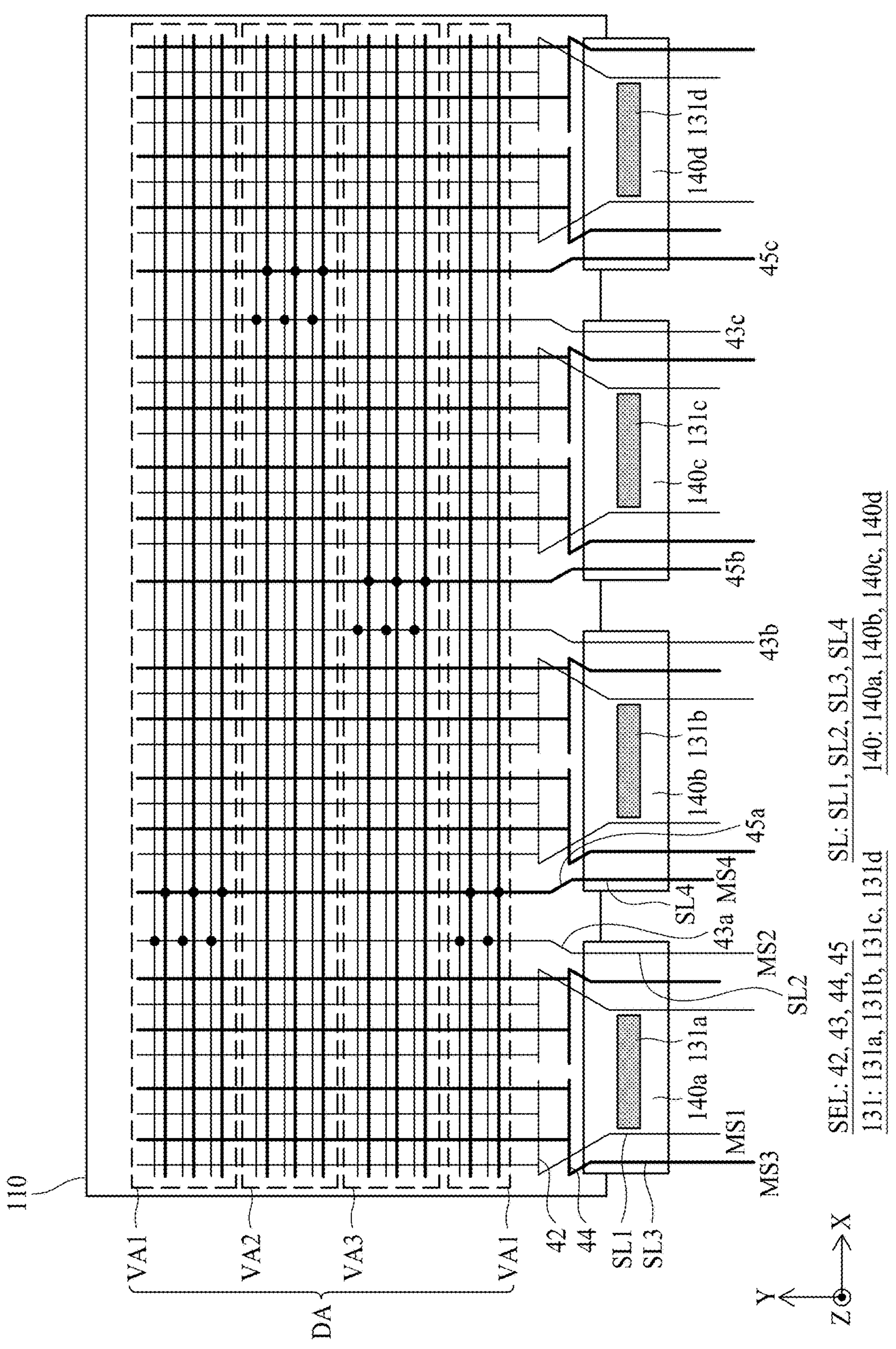
FIG. 12 is a view illustrating another example of a second mode selection line and a fourth mode selection line in a display device according to another embodiment of the present disclosure.

FIG. 8 is a view illustrating an example of a first mode selection line and a third mode selection line in a display device according to one embodiment of the present disclosure. FIG. 9A is a view illustrating an example of a connection structure between first and third mode selection lines and subpixels, and FIG. 9B is a view illustrating another example of a connection structure between first and third mode selection lines and subpixels. FIG. 10 is a view illustrating an example of a second mode selection line and a fourth mode selection line in a display device according to one embodiment of the present disclosure. FIG. 11 is a view illustrating an example of a first mode selection line and a third mode selection line in a display device according to another embodiment of the present disclosure. FIG. 12 is a view illustrating another example of a second mode selection line and a fourth mode selection line in a display device according to another embodiment of the present disclosure.

Referring to FIGS. 8 to 12, the display panel 110 according to one embodiment of the present disclosure may be connected to a plurality of circuit films 140*a* to 140*d* on which a plurality of data drive ICs 131*a* to 131*d* are packaged, respectively. The plurality of circuit films 140*a* to 140*d* may be disposed in a row in the first direction (e.g., X-axis direction), and may be bonded to a pad area provided in the bezel area BZ of the display panel 110. The plurality of circuit films 140*a* to 140*d* may be bonded to the pad area provided on the printed circuit board 150 on which the timing controller 160 is mounted, as shown in FIG. 11.

The display area DA of the display panel 110 may be divided into a plurality of first display areas HA1 to HA8 as shown in FIG. 8. The plurality of first display areas HA1 to HA8 may be disposed in a direction parallel with the arrangement direction of the plurality of circuit films 140*a* to 140*d*. That is, the plurality of first display areas HA1 to HA8 may be disposed to be adjacent to each other in the second direction (e.g., X-axis direction) or a left-right direction. Each of the plurality of first display areas HA1 to HA8 may include at least one column line including subpixels SP.

The first mode selection line 42 and the third mode selection line 44 may be disposed in each of the plurality of first display areas HA1 to HA8. The plurality of first display areas HA1 to HA8 may independently control a viewing angle. In the display device 100 according to one embodiment of the present disclosure, only one first mode selection line 42 and one third mode selection line 44 may be disposed in one display area. In this case, one first mode selection line 42 may mean lines electrically connected to each other so that the same first mode selection signal MS1 is applied thereto. Also, one third mode selection line 44 may mean lines electrically connected to each other so that the same third mode selection signal MS3 is applied thereto. The plurality of first display areas HA1 to HA8 may correspond to the plurality of first mode selection lines 42 one to one, and may correspond to the plurality of third mode selection lines 44 one to one.

For example, the display panel 110 may be divided into eight first display areas HA1 to HA8 as shown in FIG. 8. One first mode selection line 42 may be disposed in each of the eight first display areas HA1 to HA8, and each of the first mode selection lines 42 may be connected to one of the plurality of circuit films 140*a* to 140*d* to receive the first mode selection signal MS1. In addition, one third mode selection line 44 is disposed in each of the eight first display areas HA1 to HA8, and each of the third mode selection lines 44 may be connected to one of the plurality of circuit films 140*a* to 140*d* to receive the third mode selection signal MS3.

Signal lines SL1 and SL3 may be provided in each of the plurality of circuit films 140*a* to 140*d*. Each of the signal lines SL1 and SL3 may be connected to each of different mode selection lines 42 and 44. For example, each of the plurality of circuit films 140*a* to 140*d* may be provided with two first signal lines SL1 and two third signal lines SL3, as shown in FIG. 8. The two first signal lines SL1 may be connected to two first mode selection lines 42, respectively. The two third signal lines SL3 may be connected to the two third mode selection lines 44, respectively. When there are four circuit films 140*a* to 140*d*, sixteen first and third signal lines SL1 and SL3 provided in the four circuit films 140*a* to 140*d* may be connected to eight first mode selection lines 42 and eight third mode selection lines 44, respectively.

For example, the first mode selection line 42 and the third mode selection line 44 may be disposed in one first display area HA1, and each of the first mode selection line 42 and the third mode selection line 44 may be extended to the pad area included in the bezel area BZ, and thus may be connected to the first signal line SL1 and the third signal line SL3 of the first circuit film 140*a*. The first mode selection line 42 may receive the first mode selection signal MS1 for one first display area HA1 from the timing controller 160 of the printed circuit board 150 through the first signal line SL1 of the first circuit film 140*a*. The third mode selection line 44 may receive the third mode selection signal MS3 for one first display area HA1 from the timing controller 160 of the printed circuit board 150 through the third signal line SL3 of the first circuit film 140*a*.

The first mode selection lines 42 or the third mode selection lines 44, which are disposed in each of the plurality of first display areas HA1 to HA8, are separated from each other without being electrically connected to each other, so that different first mode selection signals MS1 or different third mode selection signals MS3 may be supplied independently. Meanwhile, the first mode selection lines 42 disposed in one of the first display areas HA1 to HA8 may include lines which are electrically connected to each other so that the same first mode selection signal MS1 is supplied thereto. The third mode selection lines 44 disposed in one of the first display areas HA1 to HA8 may include lines which are electrically connected to each other so that the same third mode selection signal MS3 is supplied thereto.

In one embodiment, one mode selection line 42 or 44 may include a plurality of first lines 42-1 or 44-1 and a second line 42-2 or 44-2 as shown in FIG. 9A. Each of the plurality of first lines 42-1 or 44-1 may be disposed between the subpixels SP1, SP2 and SP3 in the first display areas HA1 to HA8 corresponding to the corresponding mode selection line 42 or 44, and may be extended in the first direction (e.g., Y-axis direction). Each of the plurality of first lines 42-1 or 44-1 may be extended from the first display areas HA1 to HA8 to the bezel area BZ toward the circuit film 140.

The plurality of first lines 42-1 or 44-1 may be provided as the same number as the number of columns of the subpixels SP provided in the corresponding first display areas HA1 to HA8 as shown in FIG. 9A. Two adjacent first lines 42-1 or 44-1 may be spaced apart from each other in the second direction (e.g., X-axis direction) with one subpixel SP interposed therebetween. Each of the plurality of first lines 42-1 of the first mode selection line 42 may be connected to the plurality of subpixels SP arranged in the first direction (e.g., Y-axis direction) while being extended in the first direction (e.g., Y-axis direction), thereby supplying the first mode selection signal MS1. Each of the plurality of first lines 44-1 of the third mode selection line 44 may be connected to the plurality of subpixels SP arranged in the first direction (e.g., Y-axis direction) while being extended in the first direction (e.g., Y-axis direction), thereby supplying the third mode selection signal MS3.

The second line 42-2 or 44-2 may be disposed in the bezel area BZ, and may connect the plurality of first lines 42-1 or 44-1 extended to the bezel area BZ. The second line 42-2 or 44-2 may be extended toward the pad area on at least one end as shown in FIG. 8, and thus may be connected to the signal line SL1 or SL3 of the circuit film 140. The second line 42-2 or 44-2 may transfer the mode selection signal MS1 or MS3 supplied through the signal line SL1 or SL3 of the circuit film 140 to the plurality of first lines 42-1 or 44-1.

As a result, the second line 42-2 of the first mode selection line 42 may supply the first mode selection signal MS1 to each of the subpixels SP connected to the plurality of first lines 42-1 in the corresponding first display areas HA1 to HA8. In this case, the same first mode selection signal MS1 may be applied to the plurality of first lines 42-1 and the second line 42-2, which constitute one first mode selection line 42.

In addition, the second line 44-2 of the third mode selection line 44 may supply the third mode selection signal MS3 to each of the subpixels SP connected to the plurality of first lines 44-1 in the corresponding first display areas HA1 to HA8. In this case, the same third mode selection signal MS3 may be applied to the plurality of first lines 44-1 and the second line 44-2, which constitute one third mode selection line 44.

In another embodiment, one mode selection line 42 or 44 may include a plurality of first lines 42-1 or 44-1, a second line 42-2 or 44-2, and a plurality of third lines 42-3 or 44-3, as shown in FIG. 9B. Each of the plurality of first lines 42-1 or 44-1 may be disposed between the subpixels SP in the first display areas HA1 to HA8 corresponding to the corresponding mode selection line 42 or 44, and may be extended in the first direction (e.g., Y-axis direction). Each of the plurality of first lines 42-1 or 44-1 may be extended from the first display areas HA1 to HA8 to the bezel area BZ toward the circuit film 140.

The plurality of first lines 42-1 or 44-1 may be provided as a smaller number than the number of columns of the subpixels SP provided in the corresponding first display areas HA1 to HA8 as shown in FIG. 9B. Two adjacent first lines 42-1 or 44-1 may be spaced apart from each other in the second direction (e.g., X-axis direction) with the plurality of subpixels SP interposed therebetween. Each of the plurality of first lines 42-1 of the first mode selection line 42 may be connected to the plurality of subpixels SP arranged in the first direction (e.g., Y-axis direction) while being extended in the first direction (e.g., Y-axis direction), thereby supplying the first mode selection signal MS1. Each of the plurality of first lines 44-1 of the third mode selection line 44 may be connected to the plurality of subpixels SP arranged in the first direction (e.g., Y-axis direction) while being extended in the first direction (e.g., Y-axis direction), thereby supplying the third mode selection signal MS3.

Each of the plurality of third lines 42-3 or 44-3 may be disposed between the subpixels SP in the first display areas HA1 to HA8 corresponding to the corresponding mode selection line 42 or 44, and may be extended in the second direction (e.g., X-axis direction). Each of the plurality of third lines 42-3 or 44-3 may be connected to the plurality of first lines 42-1 or 44-3 while being extended in the second direction (e.g., X-axis direction). Also, each of the plurality of third lines 42-3 or 44-3 may be connected to the plurality of subpixels SP arranged in the second direction (e.g., X-axis direction) while being extended in the second direction (e.g., X-axis direction), thereby supplying the mode selection signal MS1 or MS3.

The second line 42-2 or 44-2 may be disposed in the bezel area BZ, and may connect the plurality of first lines 42-1 or 44-2 extended to the bezel area BZ. The second line 42-2 or 44-2 may be extended toward the pad area on at least one end, as shown in FIG. 8, and may be connected to the signal line SL1 or SL3 of the circuit film 140. The second line 42-2 or 44-2 may transfer the mode selection signal MS1 or MS3 supplied through the signal line SL1 or SL3 of the circuit film 140 to the plurality of first lines 42-1 or 44-1.

As a result, the second line 42-2 of the first mode selection line 42 may supply the first mode selection signal MS1 to the subpixels SP connected to the plurality of first lines 42-1 and the plurality of third lines 42-3 in the corresponding first display areas HA1 to HA8. In this case, the same first mode selection signal MS1 may be applied to the plurality of first lines 42-1, the second line 42-2 and the plurality of third lines 42-3, which constitute one first mode selection line 42.

In addition, the second line 44-2 of the third mode selection line 44 may supply the third mode selection signal MS3 to the plurality of subpixels SP connected to the plurality of first lines 44-1 and the plurality of third lines 44-3 in the corresponding first display areas HA1 to HA8. In this case, the same third mode selection signal MS3 may be applied to the plurality of first lines 44-1, the second line 44-2 and the plurality of third lines 44-3, which constitute one third mode selection line 44.

As a result, the first mode selection line 42 disposed in one of the first display areas HA1 to HA8 may be connected to the subpixels SP included in at least one column line to supply the first mode selection signal MS1. Also, the third mode selection line 44 disposed in one of the first display areas HA1 to HA8 may be connected to the subpixels SP included in at least one column line to supply the third mode selection signal MS3.

Meanwhile, the display area DA of the display panel 110 may be divided into a plurality of second display areas VA1 and VA2 as shown in FIG. 10. The plurality of second display areas VA1 and VA2 may be disposed in a direction perpendicular to the arrangement direction of the plurality of circuit films 140*a* to 140*d*. That is, the plurality of second display areas VA1 and VA2 may be disposed to be adjacent to each other in the first direction (e.g., Y-axis direction) or a vertical direction. Each of the plurality of second display areas VA1 and VA2 may include at least one row line including subpixels SP.

The second mode selection line 43 and the fourth mode selection line 45 may be disposed in each of the plurality of second display areas VA1 and VA2. The plurality of second display areas VA1 and VA2 may independently control a viewing angle. In the display device 100 according to one embodiment of the present disclosure, only one second mode selection line 43 and one fourth mode selection line 45 may be disposed in one second display area VA1 or VA2. In this case, one second mode selection line 43 may mean lines electrically connected to each other so that the same second mode selection signal MS2 is applied thereto. Also, one fourth mode selection line 45 may mean lines electrically connected to each other so that the same fourth mode selection signal MS4 is applied thereto. The plurality of second display areas VA1 and VA2 may correspond to the plurality of second mode selection lines 43 one to one, and may correspond to the plurality of fourth mode selection lines 45 one to one.

For example, the display panel 110 may be divided into two second display areas VA1 and VA2 as shown in FIG. 10. The second display areas VA1 and VA2 may be divided into an intermediate display area VA2 and an upper and lower display area VA1 vertically disposed with the intermediate display area VA2 interposed therebetween. One second mode selection line 43 may be disposed in each of the two second display areas VA1 and VA2, and each of the second mode selection lines 43 may be connected to one of the plurality of circuit films 140*a* to 140*d* to receive the second mode selection signal MS2. One second mode selection line 43*a* may be disposed in one second display area VA1, and another second mode selection line 43*b* may be disposed in the other second display area VA2.

In addition, one fourth mode selection line 45 may be disposed in each of the two second display areas VA1 and VA2, and each of the fourth mode selection lines 45 may be connected to one of the plurality of circuit films 140*a* to 140*d* to receive the fourth mode selection signal MS4. One fourth mode selection line 45*a* may be disposed in one second display area VA1, and another fourth mode selection line 45*b* may be disposed in the other second display area VA2.

At least one of the plurality of circuit films 140*a* to 140*d* may be provided with signal lines SL2 and SL4. Each of the signal lines SL2 and SL4 may be connected to different mode selection lines 43 and 45. As an example, at least one of the plurality of circuit films 140*a* to 140*d* may be provided with the second signal line SL2 or the fourth signal line SL4 as shown in FIG. 10. The second signal line SL2 may be connected to the second mode selection line 43, and the fourth signal line SL4 may be connected to the fourth mode selection line 45. As shown in FIG. 10, two second mode selection lines 43 and two fourth mode selection lines 45 may be required to provide the second display areas VA1 and VA2, which are divided into two in the first direction (e.g., Y-axis direction) or the vertical direction. In this case, one of the two second signal lines SL2 and one of the two fourth signal lines SL4 may be provided in each of the four circuit films 140*a* to 140*d*.

The second mode selection line 43 and the fourth mode selection line 45 may be disposed in each of the second display areas VA1 and VA2, and the second mode selection line 43 and the fourth mode selection line 45 may be extended to the pad area included in the bezel area BZ, respectively, and may be connected to the second signal line SL2 and the fourth signal line SL4 of the first circuit film 140*a*. For example, the second mode selection line 43 may receive the second mode selection signal MS2 for one second display area VA1 from the timing controller 160 of the printed circuit board 150 through the second signal line SL2 of the first circuit film 140*a*. The fourth mode selection line 45 may receive the fourth mode selection signal MS4 for one second display area VA1 from the timing controller 160 of the printed circuit board 150 through the fourth signal line SL4 of the second circuit film 140*b*.

The second mode selection lines 43 or the fourth mode selection lines 44, which are disposed in each of the plurality of second display areas VA1 and VA2, are separated from each other without being electrically connected to each other, so that different second mode selection signals MS2 or different fourth mode selection signals MS4 may be supplied independently. Meanwhile, the second mode selection lines 43 disposed in one of the second display areas VA1 and VA2 may include lines which are electrically connected to each other so that the same second mode selection signal MS2 is supplied thereto. The fourth mode selection lines 45 disposed in one of the second display areas VA1 and VA2 may include lines which are electrically connected to each other so that the same fourth mode selection signal MS4 is supplied thereto.

In one embodiment, each of the second mode selection lines 43*a* and 43*b* may include a first line 43*a*-1 or 43*b*-1 and a plurality of second lines 43*a*-2 and 43*b*-2. The first line 43*a*-1 or 43*b*-1 may be extended in the first direction (e.g., Y-axis direction) inside the display area DA, and may be extended to the bezel area BZ toward the circuit film 140. The first line 43*a*-1 or 43*b*-1 may be connected to the second signal line SL2 of the circuit film 140 on at least one end. The first line 43*a*-1 or 43*b*-1 may transfer the second mode selection signal MS2 supplied through the second signal line SL2 of the circuit film 140 to the first line 43*a*-1 or 43*b*-1.

The plurality of second lines 43*a*-2 and 43*b*-2 may be extended in the second direction (e.g., X-axis direction) inside the second display areas VA1 and VA2 corresponding to the second mode selection lines 43*a* and 43*b*, as shown in FIG. 10. The second mode selection line 43*a* corresponding to one second display area VA1 may include a plurality of second lines 43*a*-2 extended in the second direction (e.g., X-axis direction) inside one second display area VAL. The plurality of second lines 43*a*-2 may be electrically connected to the first line 43*a*-1, so that the second mode selection signal MS2 for one second display area VA1 may be applied through the first line 43*a*-1.

The second mode selection line 43*b* corresponding to the other second display area VA2 may include a plurality of second lines 43*b*-2 extended in the second direction (e.g., X-axis direction) inside the other second display area VA2. The plurality of second lines 43*b*-2 may be electrically connected to the first line 43*b*-1 so that the second mode selection signal MS2 for the other second display area VA2 may be applied through the first line 43*b*-1.

The plurality of second lines 43*a*-2 and 43*b*-2 may be provided as the same number as the number of rows of the subpixels SP provided in the corresponding second display areas VA1 and VA2. Each of the plurality of second lines 43*a*-2 and 43*b*-2 of the second mode selection lines 43*a* and 43*b* may be connected to the plurality of subpixels SP arranged in the second direction (e.g., X-axis direction) while being extended in the second direction (e.g., X-axis direction), thereby supplying the second mode selection signal MS2.

In one embodiment, each of the fourth mode selection lines 45*a* and 45*b* may include a first line 45*a*-1 or 45*b*-1 and a plurality of second lines 45*a*-2 and 45*b*-2. The first line 45*a*-1 or 45*b*-1 may be extended in the first direction (e.g., Y-axis direction) inside the display area DA, and may be extended to the bezel area BZ toward the circuit film 140. The first line 45*a*-1 or 45*b*-1 may be connected to the fourth signal line SL4 of the circuit film 140 on at least one end. The first line 45*a*-1 or 45*b*-1 may transfer the fourth mode selection signal MS4 supplied through the fourth signal line SL4 of the circuit film 140 to the first line 45*a*-1 or 45*b*-1.

The plurality of second lines 45*a*-2 and 45*b*-2 may be extended in the second direction (e.g., X-axis direction) inside the second display areas VA1 and VA2 corresponding to the fourth mode selection lines 45*a* and 45*b*, as shown in FIG. 10. The fourth mode selection line 45*a* corresponding to one second display area VA1 may include a plurality of second lines 45*a*-2 extended in the second direction (e.g., X-axis direction) inside one second display area VAL. The plurality of second lines 45*a*-2 may be electrically connected to the first line 45*a*-1, so that the fourth mode selection signal MS4 for one second display area VA1 may be applied through the first line 45*a*-1.

The fourth mode selection line 45*b* corresponding to the other second display area VA2 may include a plurality of second lines 45*b*-2 extended in the second direction (e.g., X-axis direction) inside the other second display area VA2. The plurality of second lines 45*b*-2 may be electrically connected to the first line 45*b*-1 so that the fourth mode selection signal MS4 for the other second display area VA2 may be applied through the first line 45*b*-1.

The plurality of second lines 45*a*-2 and 45*b*-2 may be provided as the same number as the number of rows of the subpixels SP provided in the corresponding second display areas VA1 and VA2. Each of the plurality of second lines 45*a*-2 and 45*b*-2 of the fourth mode selection lines 45*a* and 45*b* may be connected to the plurality of subpixels SP arranged in the second direction (e.g., X-axis direction) while being extended in the second direction (e.g., X-axis direction), thereby supplying the fourth mode selection signal MS4.

In FIGS. 8 to 10, the number of second display areas VA1 and VA2 divided in the first direction (e.g., Y-axis direction) or the vertical direction is shown as two, but the present disclosure is not limited thereto. As shown in FIGS. 11 and 12, three or more second display areas VA1 to VA2 may be provided.

In this case, the second display areas VA1 to VA2 may be divided into a first intermediate display area VA2, a second intermediate display area VA3, and an upper and lower display areas VA1 vertically disposed with the intermediate display areas VA2 and VA3 interposed therebetween. One second mode selection line 43 may be disposed in each of the three second display areas VA1 to VA3, and each of the second mode selection lines 43 may be connected to one of the plurality of circuit films 140*a* to 140*d* to receive the second mode selection signal MS2. One second mode selection line 43*a* may be disposed in one second display area VA1, another second mode selection line 43*b* may be disposed in another second display area VA2, and the other second mode selection line 43*c* may be disposed in the other second display area VA3.

In addition, one fourth mode selection line 45 may be disposed in each of the three second display areas VA1 to VA3, and each of the fourth mode selection lines 45 may be connected to one of the plurality of circuit films 140*a* to 140*d* to receive the fourth mode selection signal MS4. One fourth mode selection line 45*a* may be disposed in one second display area VA1, another fourth mode selection line 45*b* may be disposed in another second display area VA2, and the other fourth mode selection line 45*c* may be disposed in the other second display area VA3.

The display panel 110 according to one embodiment of the present disclosure is divided into a plurality of first display areas HA1 to HA8, and a viewing angle for the plurality of first display areas HA1 to HA8 may be selected using the first mode selection signal MS1 applied through the first mode selection line 42 and the third mode selection signal MS3 applied through the third mode selection line 44. The display panel 110 according to one embodiment of the present disclosure may select a viewing angle in the second direction (e.g., X-axis direction) or the left-right direction by using the first mode selection signal MS1 and the third mode selection signal MS3.

In addition, the display panel 110 according to one embodiment of the present disclosure may be divided into a plurality of second display areas VA1 and VA2, and may select viewing angles for the plurality of second display areas VA1 to VA2 by using the second mode selection signal MS2 applied through the second mode selection line 43 and the fourth mode selection signal MS4 applied through the fourth mode selection line 45. The display panel 110 according to one embodiment of the present disclosure may select a viewing angle in the first direction (e.g., Y-axis direction) or the vertical direction by using the second mode selection signal MS2 and the fourth mode selection signal MS4.

The display panel 110 according to one embodiment of the present disclosure may be divided into a plurality of display areas of which viewing angles are independently controllable based on the plurality of first display areas HA1 to HA8 divided in the second direction (e.g., X-axis direction) or the plurality of second display areas VA1 and VA2 divided in the first direction (e.g., Y-axis direction) or the vertical direction. For example, the display panel 110 according to one embodiment of the present disclosure may be divided into 16 display areas of which viewing angles are independently controllable based on eight first display areas HA1 to HA8 and two second display areas VA1 to VA2. The display panel 110 according to one embodiment of the present disclosure may independently control a viewing angle for each of the 16 display areas by using the first to fourth mode selection signals MS1, MS2, MS3 and MS4.

Figure 13:
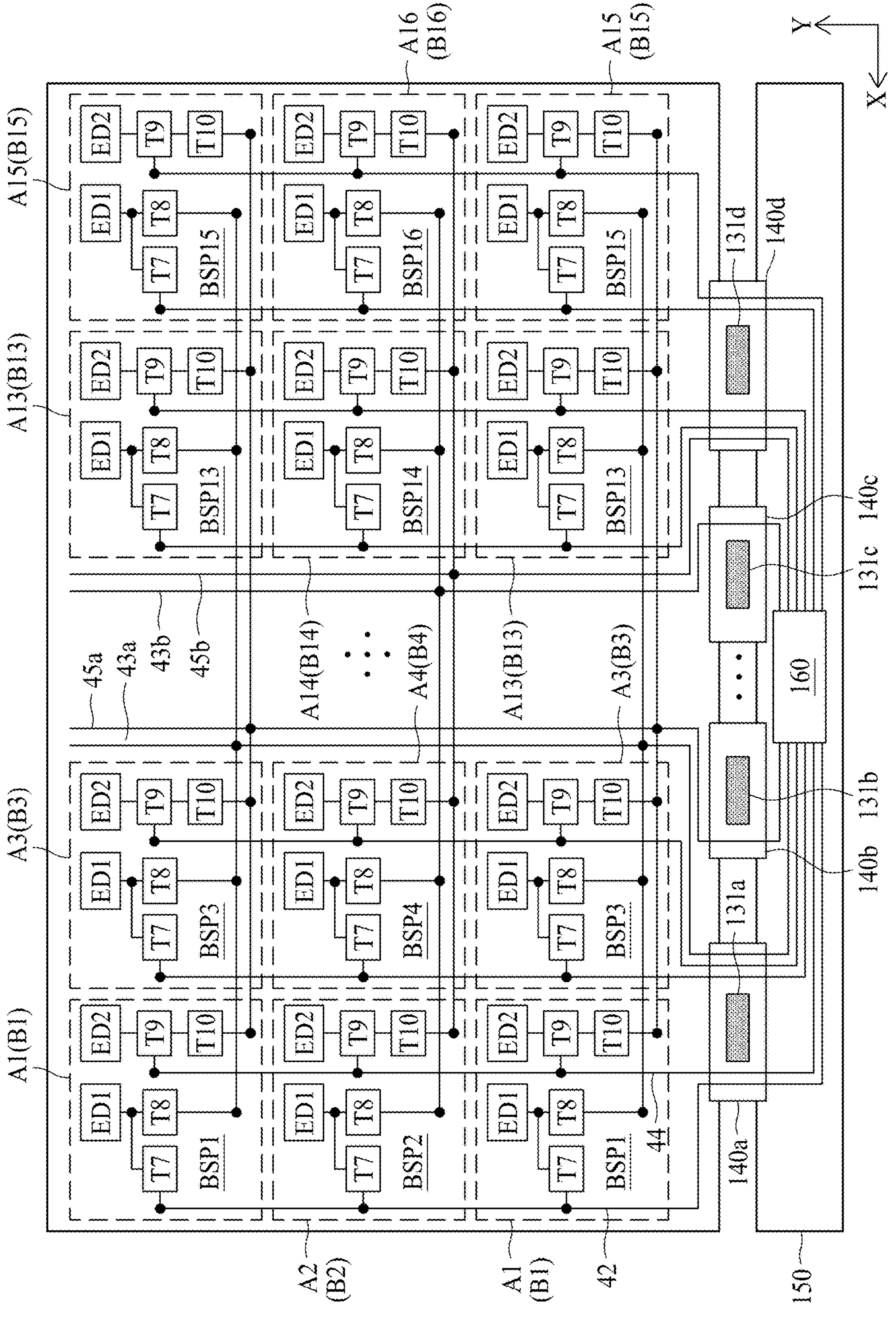
FIG. 13 is a schematic view illustrating a display device according to one embodiment of the present disclosure.
Figure 14:
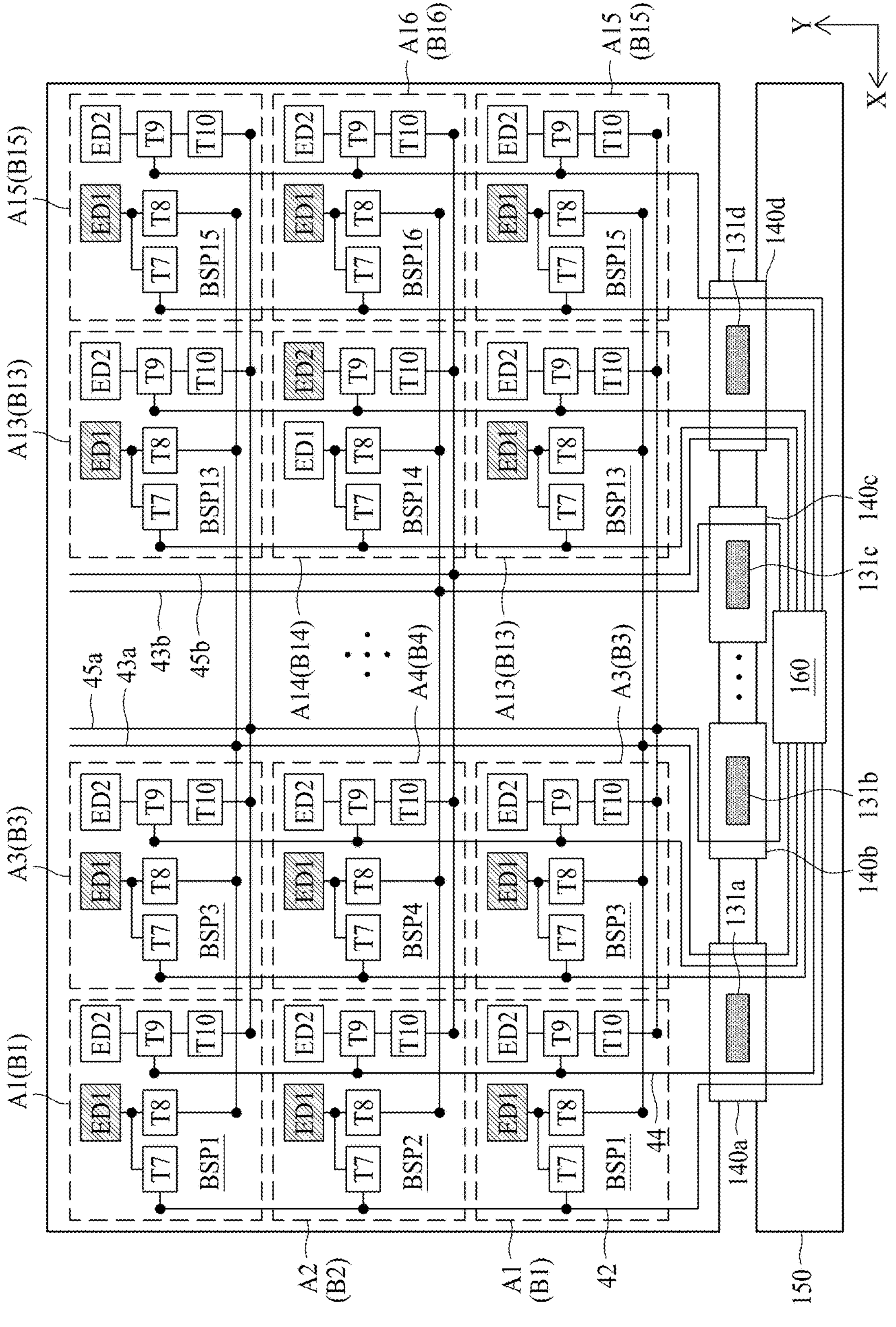
FIG. 14 is a schematic view illustrating a driving method of a display device according to one embodiment of the present disclosure.

FIG. 13 is a schematic view illustrating a display device according to one embodiment of the present disclosure, and FIG. 14 is a schematic view illustrating a driving method of a display device according to one embodiment of the present disclosure.

Referring to FIGS. 13 and 14, each of a plurality of display areas A1 to A16 may include pixel blocks B1 to B16. The plurality of pixel blocks B1 to B16 may be individually controlled by the first to fourth mode selection signals MS1, MS2, MS3, and MS4 applied through the first to fourth mode selection lines 42, 43, 44 and 45 and thus selectively controlled in the first viewing angle mode (wide viewing angle mode or share mode) or the second viewing angle mode (narrow viewing angle mode or privacy mode).

Each of the plurality of pixel blocks B1 to B16 may include a plurality of subpixels BSP. Each subpixel BSP may include a first light emitting element ED1 in which light emission is controlled by the first control transistor T7 and the second control transistor T8 of the pixel circuit, and a second light emitting element ED2 in which light emission is controlled by the third control transistor T9 and the fourth control transistor T10.

The first control transistor T7 may be controlled by the first mode selection signal MS1 supplied through the first mode selection line 42. When the first mode selection signal MS1 is the gate-on voltage VON, the first control transistor T7 may be turned on, and when the first mode selection signal MS1 is the gate-off voltage VOFF, the first control transistor T7 may be turned off. The second control transistor T8 may be controlled by the second mode selection signal MS2 supplied through the second mode selection line 43. When the second mode selection signal MS2 is the gate-on voltage VON, the second control transistor T8 may be turned on, and when the second mode selection signal MS2 is the gate-off voltage VOFF, the second control transistor T8 may be turned off.

The third control transistor T9 may be controlled by the third mode selection signal MS3 supplied through the third mode selection line 44. When the third mode selection signal MS3 is the gate-on voltage VON, the third control transistor T9 may be turned on, and when the third mode selection signal MS3 is the gate-off voltage VOFF, the third control transistor T9 may be turned off. The fourth control transistor T10 may be controlled by the fourth mode selection signal MS4 supplied through the fourth mode selection line 45. When the fourth mode selection signal MS4 is the gate-on voltage VON, the fourth control transistor T10 may be turned on, and when the fourth mode selection signal MS4 is the gate-off voltage VOFF, the fourth control transistor T10 may be turned off.

In one embodiment, the first to fourth mode selection signals MS1, MS2, MS3 and MS4 for the first to fourth mode selection lines 42, 43, 44 and 45 may be supplied from the timing controller 160 via the signal lines of the circuit film 140 and the printed circuit board 150, as shown in FIGS. 13 and 14, but are not limited thereto.

In another embodiment, the first to fourth mode selection signals MS1, MS2, MS3 and MS4 for the first to fourth mode selection lines 42, 43, 44 and 45 may be supplied from one of the data drive ICs 131*a* to 131*d* via the signal lines of the circuit film 140.

Each of the first to fourth mode selection lines 42, 43, 44 and 45 may individually receive the first to fourth mode selection signals MS1, MS2, MS3 and MS4 from the timing controller 160 or the data drive ICs 131*a* to 131*d*. Accordingly, the display panel 110 may independently control the viewing angles of the plurality of pixel blocks B1 to B16.

Each of the plurality of pixel blocks B1 to B16 may control the viewing angle mode of the corresponding pixel blocks B1 to B16 by using the first to fourth mode selection signals MS1, MS2, MS3 and MS4 applied to the corresponding pixel blocks B1 to B16.

For example, the first mode selection line 42*a* connected to the left side of the first circuit film 140*a* may receive the first mode selection signal MS1 from the timing controller 160 or the data drive IC 131*a*. The first mode selection line 42*a* connected to the left side of the first circuit film 140*a* may be disposed in the first area A1 and the second area A2, and may transfer the first mode selection signal MS1 to the subpixels BSP1 and BSP2 provided in the first pixel block B1 and the second pixel block B2.

The third mode selection line 44*a* connected to the left side of the first circuit film 140*a* may receive the third mode selection signal MS3 from the timing controller 160 or the data drive IC 131*a*. The third mode selection line 44*a* connected to the left side of the first circuit film 140*a* may be disposed in the first area A1 and the second area A2, and may transfer the third mode selection signal MS3 to the subpixels BSP1 and BSP2 provided in the first pixel block B1 and the second pixel block B2.

The second mode selection line 43*a* connected to the right side of the first circuit film 140*a* and the fourth mode selection line 45*a* connected to the left side of the second circuit film 140*b* may be disposed in the first area A1. The second mode selection line 43*a* connected to the right side of the first circuit film 140*a* may receive the second mode selection signal MS2 from the timing controller 160 or the data drive IC 131*a*, and may transfer the second mode selection signal MS2 to the subpixels BSP1 provided in the first pixel block B1. The fourth mode selection line 45*a* connected to the left side of the second circuit film 140*b* may receive the fourth mode selection signal MS4 from the timing controller 160 or the data drive IC 131*a*, and may transfer the fourth mode selection signal MS4 to the subpixels BSP1 provided in the first pixel block B1.

The second mode selection line 43*b* connected to the right side of the third circuit film 140*c* and the fourth mode selection line 45*b* connected to the left side of the fourth circuit film 140*d* may be disposed in the second area A2. The second mode selection line 43*b* connected to the right side of the third circuit film 140*c* may receive the second mode selection signal MS2 from the timing controller 160 or the data drive IC 131*a*, and may transfer the second mode selection signal MS2 to the subpixels BSP2 provided in the second pixel block B2. The fourth mode selection line 45*b* connected to the left side of the fourth circuit film 140*d* may receive the fourth mode selection signal MS4 from the timing controller 160 or the data drive IC 131*a*, and may transfer the fourth mode selection signal MS4 to the subpixels BSP2 provided in the second pixel block B2.

The viewing angle mode of the first pixel block B1 may be controlled using the first to fourth mode selection signals MS1, MS2, MS3 and MS4 respectively applied from the first mode selection line 42*a* connected to the left side of the first circuit film 140*a*, the second mode selection line 43*a* connected to the right side of the first circuit film 140*a*, the third mode selection line 44*a* connected to the left side of the first circuit film 140*a* and the fourth mode selection line 45*a* connected to the left side of the second circuit film 140*b*.

In the subpixels BSP1 provided in the first pixel block B1, when at least one of the first mode selection signal MS1 or the second mode selection signal MS2 is the gate-on voltage VON, at least one of the first control transistor T7 or the second control transistor T8 may be turned on. In this case, at least one of the third mode selection signal MS3 or the fourth mode selection signal MS4 may be the gate-off voltage VOFF. Accordingly, the subpixels BSP1 provided in the first pixel block B1 may allow the first light emitting element ED1 to emit light. The light emitted from the first light emitting element ED1 may emit light at a first viewing angle. The first area A1 including the first pixel block B1 may display an image in the first viewing angle mode, the wide viewing angle mode or the share mode.

On the other hand, in the subpixels BSP1 provided in the first pixel block B1, when the third mode selection signal MS3 and the fourth mode selection signal MS4 are the gate-on voltages VON, the third control transistor T9 and the fourth control transistor T10 may be turned on. In this case, the first mode selection signal MS1 and the second mode selection signal MS2 may be the gate-off voltages VOFF. Accordingly, the subpixels BSP1 provided in the first pixel block B1 may allow the second light emitting element ED2 to emit light. The light emitted from the second light emitting element ED2 may emit light at a second viewing angle. The first area A1 including the first pixel block B1 may display an image in the second viewing angle mode, the narrow viewing angle mode or the privacy mode.

Meanwhile, the subpixels BSP2 provided in the second pixel block B2 may control the viewing angle mode by using the first to fourth mode selection signals MS1, MS2, MS3 and MS4 respectively applied from the first mode selection line 42*a* connected to the left side of the first circuit film 140*a*, the second mode selection line 43*b* connected to the right side of the third circuit film 140*c*, the third mode selection line 44*a* connected to the left side of the first circuit film 140*a* and the fourth mode selection line 45*b* connected to the left side of the fourth circuit film 140*d*.

In the subpixels BSP2 provided in the second pixel block B2, when at least one of the first mode selection signal MS1 or the second mode selection signal MS2 is the gate-on voltage VON, at least one of the first control transistor T7 or the second control transistor T8 may be turned on. In this case, at least one of the third mode selection signal MS3 or the fourth mode selection signal MS4 may be the gate-off voltage VOFF. Accordingly, the subpixels BSP2 provided in the second pixel block B2 may allow the first light emitting element ED1 to emit light. The light emitted from the first light emitting element ED1 may emit light at a first viewing angle. The second area A2 including the second pixel block B2 may display an image in the first viewing angle mode, the wide viewing angle mode or the share mode.

On the other hand, in the subpixels BSP2 provided in the second pixel block B2, when the third mode selection signal MS3 and the fourth mode selection signal MS4 are the gate-on voltages VON, the third control transistor T9 and the fourth control transistor T10 may be turned on. In this case, the first mode selection signal MS1 and the second mode selection signal MS2 may be the gate-off voltages VOFF. Accordingly, the subpixels BSP2 provided in the second pixel block B2 may allow the second light emitting element ED2 to emit light. The light emitted from the second light emitting element ED2 may emit light at a second viewing angle. The second area A2 including the second pixel block B2 may display an image in the second viewing angle mode, the narrow viewing angle mode or the privacy mode.

The display panel 110 according to one embodiment of the present disclosure may independently control the viewing angle mode of the pixel blocks B1 to B16 divided into upper, lower, left and right portions by using the first to fourth mode selection signals MS1, MS2, MS3 and MS4 applied to the corresponding pixel blocks B1 to B16 as described above. As shown in FIG. 14, the subpixels BSP14 included in some of the plurality of pixel blocks B1 to B16 may allow the second light emitting element ED2 to emit light, so that they may be implemented in the second viewing angle mode, the narrow viewing angle mode or the privacy mode, and the subpixels BSP1 to BSP13, BSP15 and BSP16 included in the other subpixels may allow the first light emitting element ED1 to emit light, so that they may be implemented in the first viewing angle mode, the wide viewing angle mode or the share mode.

The display panel 110 according to one embodiment of the present disclosure may control the viewing angle not only in the areas HA1 to HA8 divided into a plurality of portions in the left-right direction but also in the areas VA1 and VA2 divided into a plurality of portions in the vertical direction by using the first to fourth mode selection signals MS1, MS2, MS3 and MS4. The display panel 110 according to one embodiment of the present disclosure may control the viewing angle in the left-right direction inside the display area DA, and furthermore, may control the viewing angle in the vertical direction.

The display panel 110 according to one embodiment of the present disclosure may freely divide the areas A1 to A16 capable of independently controlling a viewing angle. Since the display panel 110 according to one embodiment of the present disclosure is divided into a plurality of areas A1 to A16 of upper, lower, left and right portions, and thus may increase the number of areas A1 to A16 capable of independently controlling the viewing angle. The display panel 110 according to one embodiment of the present disclosure may control the viewing angle inside the display area DA more finely.

The display panel 110 according to one embodiment of the present disclosure may minimize or reduce the number of mode selection lines SEL for controlling viewing angles of the areas A1 to A16 divided into upper, lower, left and right portions.

For example, a total of two mode selection lines, that is, the mode selection line for selecting the first viewing angle mode and the mode selection line for selecting the second viewing angle mode may be generally required to control the viewing angle for one area. In this case, in order to independently control the viewing angles of the 16 areas A1 to A16, since two mode selection lines are required for each of the 16 areas A1 to A16, a total of 32 mode selection lines may be disposed on the display panel 110.

On the other hand, in the display device 100 according to one embodiment of the present disclosure, the first and third mode selection lines 42 and 44 may be allocated to each of the eight areas HA1 to HA8 divided in the left-right direction, and the second and fourth mode selection lines 43 and 45 may be allocated to each of the two areas VA1 and VA2 divided in the vertical direction. Since 16 mode selection lines 42 and 44 for the eight areas HA1 to HA8 divided in the left-right direction and four mode selection lines 43 and 45 for the two areas VA1 and VA2 divided in the vertical direction are required, a total of 18 mode selection lines 42, 43, 44 and 45 may be disposed on the display panel 110. In the display device 100 according to one embodiment of the present disclosure, the number of mode selection lines disposed in the display panel 110 may be significantly reduced as compared with a general display device. The display device 100 according to one embodiment of the present disclosure may implement Environment/Social/Governance (ESG) by reducing production energy and reducing occurrence of greenhouse gases in accordance with a decrease in the number of signal lines formed in the display panel 110.

In the display device 100 according to one embodiment of the present disclosure, as the number of mode selection lines SEL is reduced, the number of pads disposed in the pad area of the display panel 110 and connected to the mode selection line SEL may be reduced. The display device 100 according to one embodiment of the present disclosure may reduce a size of the pad area, and furthermore may reduce a size of the bezel area BZ. That is, the display device 100 according to one embodiment of the present disclosure may implement a narrow bezel.

Also, in the display device 100 according to one embodiment of the present disclosure, as the number of mode selection lines SEL is reduced, the number of signal lines SL connected to the mode selection line SEL through the pad of each of the plurality of circuit films 140*a* to 140*d* may be reduced. As the number of signal lines SL is increased, widths of the plurality of circuit films 140*a* to 140*d* may be increased in order to dispose a large number of signal lines SL within a limited space. As the widths of a plurality of circuit films 140*a* to 140*d* are increased, the size of the bezel area BZ to which the plurality of circuit films 140*a* to 140*d* are connected is also increased in the display panel 110. The display device 100 according to one embodiment of the present disclosure may reduce the number of signal lines SL disposed in the plurality of circuit films 140*a* to 140*d* to prevent the widths of the plurality of circuit films 140*a* to 140*d* from being reduced or increased.

According to the present disclosure, the following advantageous effects may be obtained.

In the present disclosure, the viewing angle may be controlled not only in the areas divided into a plurality of portions in the left-right direction but also in the areas divided into a plurality of portions in the vertical direction by using the first to fourth mode selection signals. In the present disclosure, the viewing angle may be controlled in the left-right direction inside the display area, and furthermore, may controlled in the vertical direction.

Also, in the present disclosure, the areas capable of independently controlling the viewing angle may be freely divided. The number of areas capable of independently controlling the viewing angle may be increased, and thus, the viewing angle in the display area may be more finely controlled.

Also, in the present disclosure, the number of mode selection lines for controlling viewing angles of areas divided into upper, lower, left and right portions may be minimized. As the number of signal lines formed in the display panel is reduced or reduced, production energy may be reduced, and occurrence of greenhouse gases may be reduced so that Environment/Social/Governance (ESG) may be implemented.

Also, as the number of pads disposed in the pad area of the display panel and connected to the mode selection line is reduced, the size of the pad area may be reduced, and furthermore, the size of the bezel area may be reduced.

The above-described features, structures, and effects of the present disclosure are included in at least one embodiment of the present disclosure, but are not limited to only one embodiment. Furthermore, the features, structures, and effects described in at least one embodiment of the present disclosure may be implemented through combination or modification of other embodiments by those skilled in the art. Therefore, content associated with the combination and modification should be construed as being within the scope of the present disclosure.

It will be apparent to those skilled in the art that the present disclosure described above is not limited by the above-described embodiments and the accompanying drawings and that various substitutions, modifications and variations may be made in the present disclosure without departing from the technical idea or scope of the present disclosure. Consequently, the scope of the present disclosure is defined by the accompanying claims and it is intended that all variations or modifications derived from the meaning, scope and equivalent concept of the claims fall within the scope of the present disclosure.

The various embodiments described above can be combined to provide further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the present disclosure.

What is claimed is:

1. A display device, comprising:

a display panel including a display area, provided with a plurality of subpixels, and a bezel area, wherein each of the plurality of subpixels includes:

a first mode subpixel having a first viewing angle and including a first light emitting element;

a second mode subpixel having a second viewing angle and including a second light emitting element;

a driving transistor connected to the first light emitting element or the second light emitting element;

first and second control transistors configured to control a connection between the first light emitting element and the driving transistor;

third and fourth control transistors configured to control a connection between the second light emitting element and the driving transistor; and a switching transistor connected to the driving transistor and commonly connected to the first, the second, and the third control transistors, wherein the first and second control transistors are connected in parallel between the first light emitting element and the switching transistor.

2. The display device of claim 1, wherein the first light emitting element is connected to the driving transistor in response to at least one of the first control transistor and the second control transistor being turned on.

3. The display device of claim 1, wherein the third and fourth control transistors are connected in series between the second light emitting element and the switching transistor.

4. The display device of claim 1, wherein the second light emitting element is connected to the driving transistor in response to the third and fourth control transistors being turned on.

5. The display device of claim 1, further comprising:

a first mode selection line for supplying a first mode selection signal; and a second mode selection line for supplying a second mode selection signal, wherein the first control transistor is configured to be applied with the first mode selection signal from the first mode selection line and is configured to be turned on or turned off in accordance with the first mode selection signal, and the second control transistor is configured to be applied with the second mode selection signal from the second mode selection line and is configured to be turned on or off in accordance with the second mode selection signal.

6. The display device of claim 1, further comprising:

a third mode selection line for supplying a third mode selection signal; and a fourth mode selection line for supplying a fourth mode selection signal, wherein the third control transistor is configured to be applied with the third mode selection signal from the third mode selection line and is configured to be turned on or turned off in accordance with the third mode selection signal, and the fourth control transistor is configured to be applied with the fourth mode selection signal from the fourth mode selection line and is configured to be turned on or off in accordance with the fourth mode selection signal.

7. The display device of claim 1, further comprising:

a first mode selection line for supplying a first mode selection signal to the first control transistor;

a second mode selection line for supplying a second mode selection signal to the second control transistor;

a third mode selection line for supplying a third mode selection signal to the third control transistor; and a fourth mode selection line for supplying a fourth mode selection signal to the fourth control transistor, wherein the first mode selection signal and the third mode selection signal have phases opposite to each other.

8. The display device of claim 7, wherein the third mode selection signal corresponding to a gate-off voltage is configured to be supplied to the third mode selection line in response to the first mode selection signal corresponding to a gate-on voltage being supplied to the first mode selection line, and the third mode selection signal corresponding to the gate-on voltage is configured to be supplied to the third mode selection line in response to the first mode selection signal corresponding to the gate-off voltage being supplied to the first mode selection line.

9. The display device of claim 7, wherein the second mode selection signal and the fourth mode selection signal have phases opposites to each other.

10. The display device of claim 9, wherein the fourth mode selection signal corresponding to a gate-off voltage is configured to be supplied to the fourth mode selection line in response to the second mode selection signal corresponding to a gate-on voltage being supplied to the second mode selection line, and the fourth mode selection signal corresponding to the gate-on voltage is configured to be supplied to the fourth mode selection line in response to the second mode selection signal corresponding to the gate-off voltage being supplied to the second mode selection line.

11. The display device of claim 7, further comprising a plurality of column lines including subpixels arranged in a first direction, wherein the first mode selection line comprises first mode selection lines, and each of the first mode selection lines is connected to the first control transistors of the subpixels included in at least one column line, and wherein the third mode selection line comprises third mode selection lines, and each of the third mode selection lines is connected to the third control transistors of the subpixels included in at least one column line.

12. The display device of claim 7, further comprising a plurality of row lines including subpixels arranged in a second direction, wherein the second mode selection line comprises second mode selection lines, and each of the second mode selection lines is connected to the second control transistors of the subpixels included in at least one row line, and wherein the fourth mode selection line comprises fourth mode selection lines, and each of the fourth mode selection lines is connected to the fourth control transistors of the subpixels included in at least one row line.

13. The display device of claim 7, further comprising a timing controller for supplying the first to fourth mode selection signals to the first to fourth mode selection lines, respectively.

14. The display device of claim 1, wherein the first viewing angle and the second viewing angle are different from each other in at least one of a direction or an angle range.

15. The display device of claim 1, wherein the second mode subpixel is disposed to be adjacent to the first mode subpixel.

* * * * *